United States Patent
Sakamoto

(10) Patent No.: US 10,078,407 B2
(45) Date of Patent: Sep. 18, 2018

(54) DISPLAY DEVICE

(71) Applicant: Japan Display Inc., Minato-ku (JP)

(72) Inventor: Michiaki Sakamoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 78 days.

(21) Appl. No.: 15/184,572

(22) Filed: Jun. 16, 2016

(65) Prior Publication Data

US 2016/0370931 A1    Dec. 22, 2016

(30) Foreign Application Priority Data

Jun. 17, 2015   (JP) .................................. 2015-121976

(51) Int. Cl.
*G06F 3/041*   (2006.01)
*G06F 3/044*   (2006.01)
*G09G 3/36*    (2006.01)

(52) U.S. Cl.
CPC ............ *G06F 3/044* (2013.01); *G06F 3/0412* (2013.01); *G09G 3/3648* (2013.01); *G09G 3/3677* (2013.01); *G09G 2300/0426* (2013.01); *G09G 2300/0439* (2013.01); *G09G 2300/0478* (2013.01)

(58) Field of Classification Search
None
See application file for complete search history.

(56) References Cited

U.S. PATENT DOCUMENTS

| | | | |
|---|---|---|---|
| 5,982,462 A | | 11/1999 | Nakano et al. |
| 9,385,112 B1* | | 7/2016 | Takesako ............ H01L 27/0207 |
| 2010/0182273 A1 | | 7/2010 | Noguchi et al. |
| 2014/0146013 A1 | | 5/2014 | Noguchi et al. |
| 2014/0232955 A1* | | 8/2014 | Roudbari ................ G06F 3/041 349/12 |
| 2014/0292718 A1 | | 10/2014 | Noguchi et al. |

FOREIGN PATENT DOCUMENTS

| | | |
|---|---|---|
| JP | 9-244067 | 9/1997 |
| JP | 2009-244958 | 10/2009 |

* cited by examiner

*Primary Examiner* — Joseph Haley
(74) *Attorney, Agent, or Firm* — Oblon, McClelland, Maier & Neustadt, L.L.P.

(57) ABSTRACT

According to one embodiment, a display device includes a first substrate including a scanning line, a control line, a control electrode, a signal line, a pixel electrode, a first switching element, and a second switching element. The first switching element includes a first semiconductor layer, a first gate electrode, and a first insulating film. The second switching element includes a second semiconductor layer, a second gate electrode, and a second insulating film. The control electrode is overlapped with the second gate electrode.

13 Claims, 17 Drawing Sheets

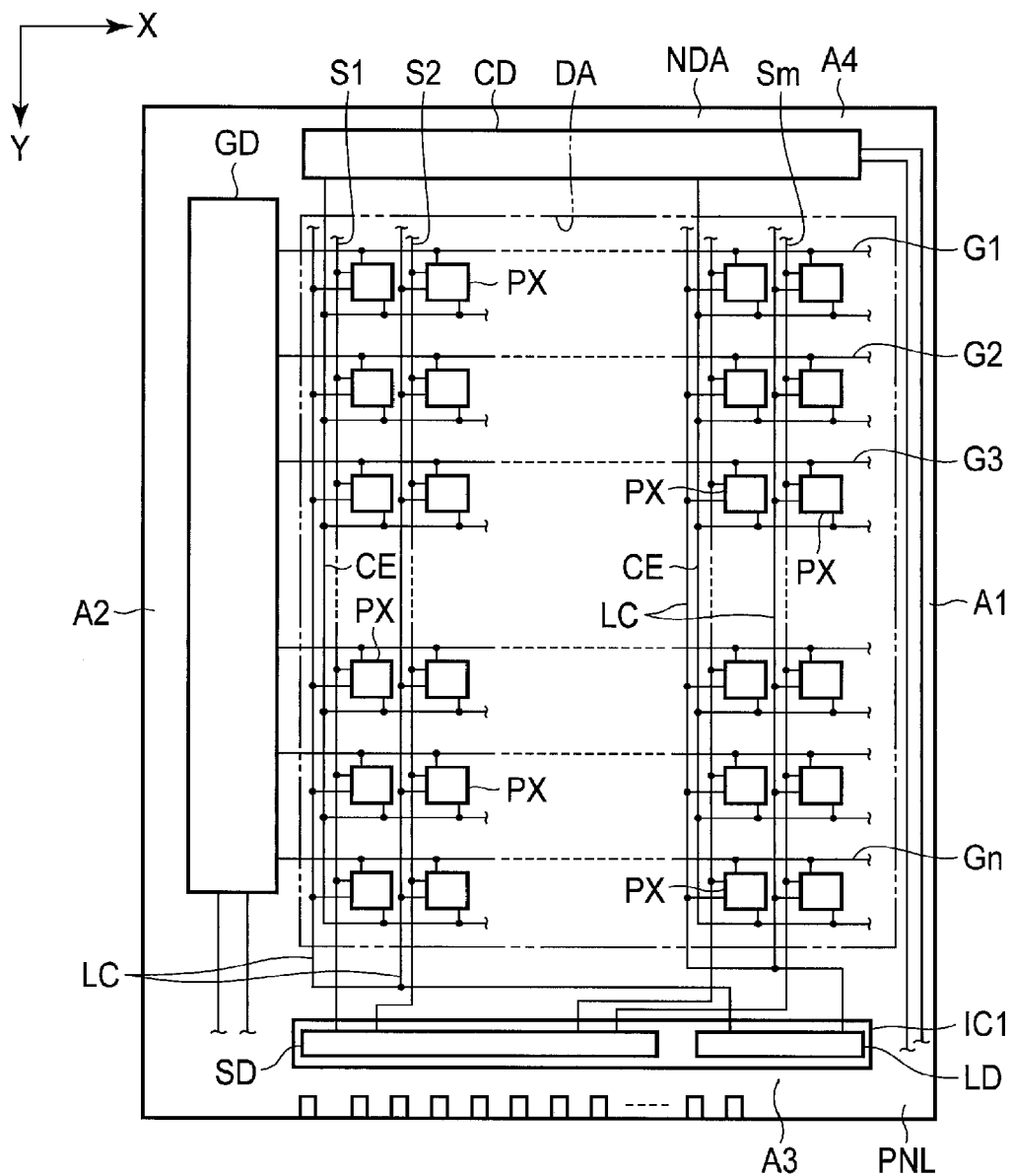
F I G. 2

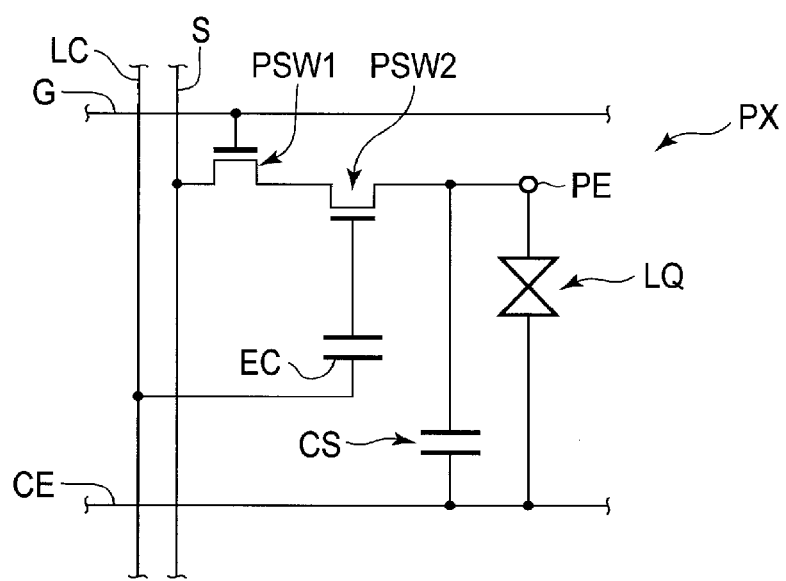
F I G. 3

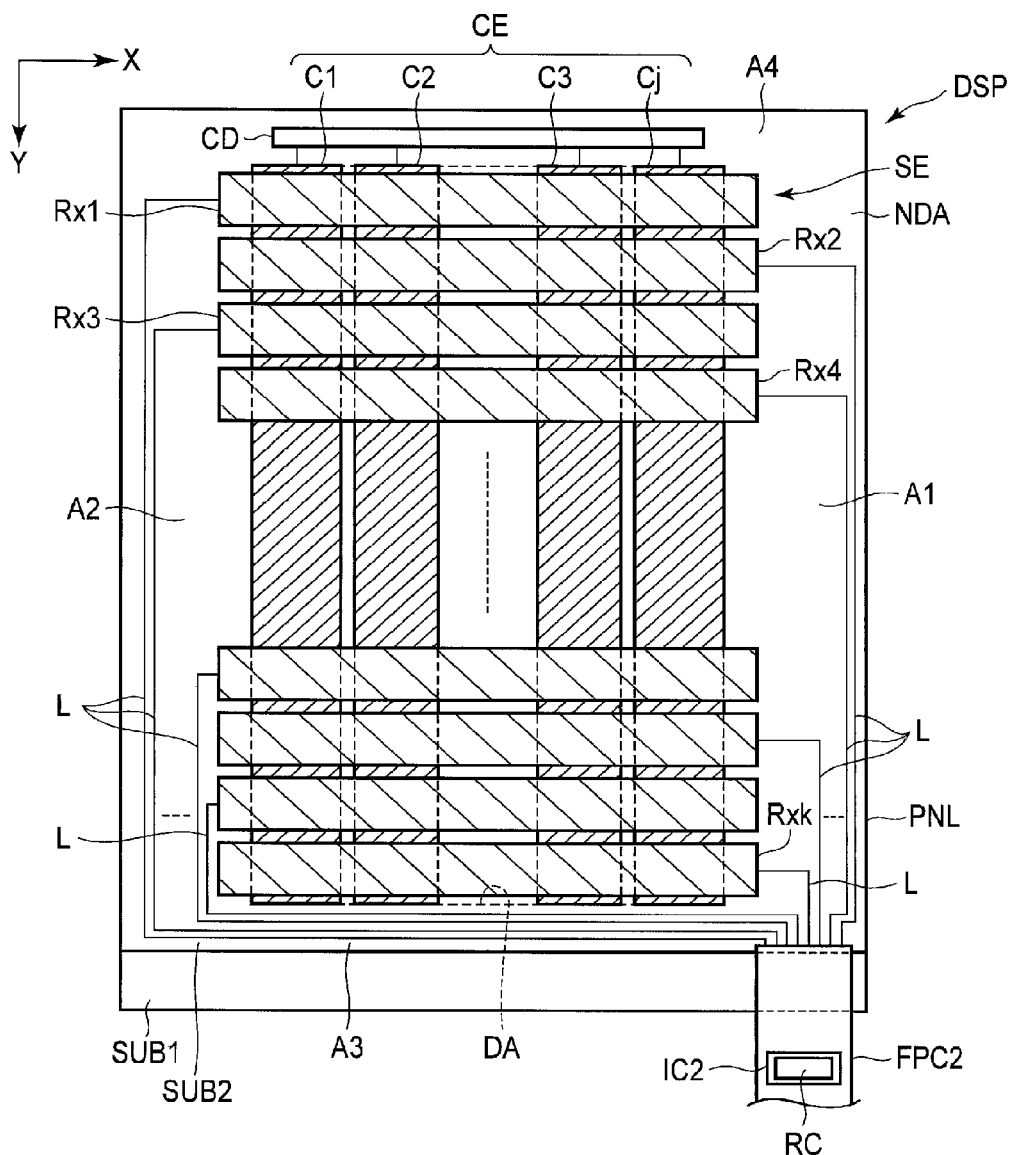
F I G. 5

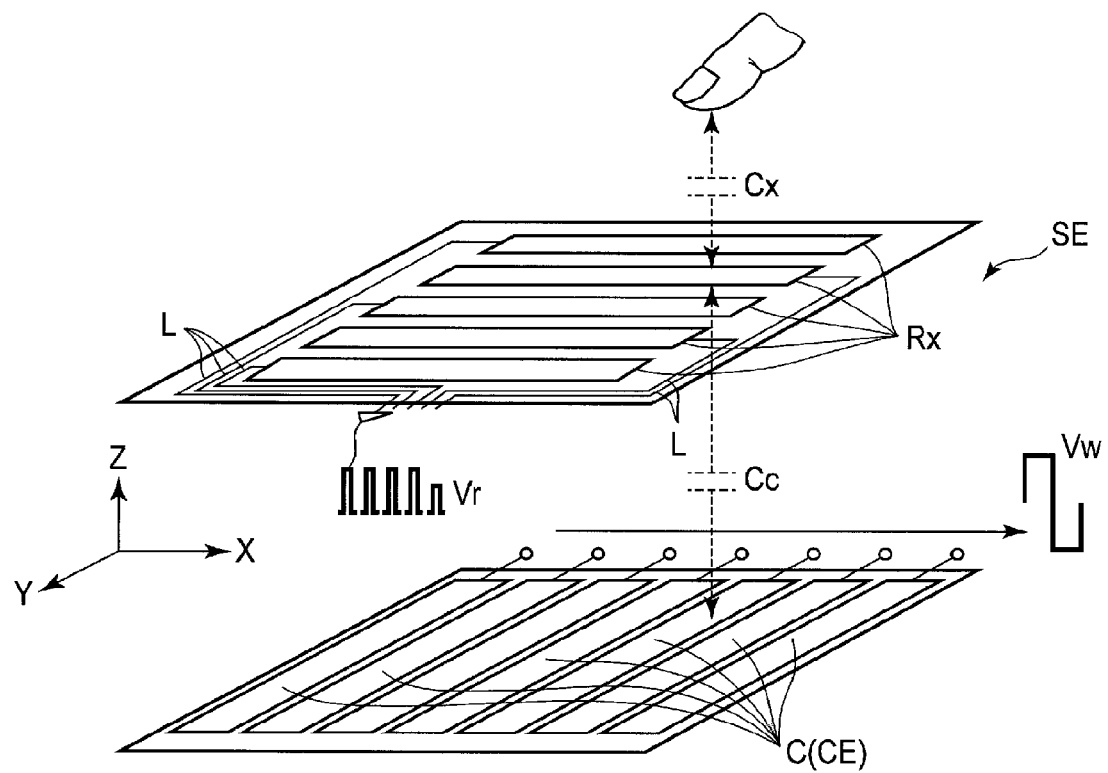
F I G. 7

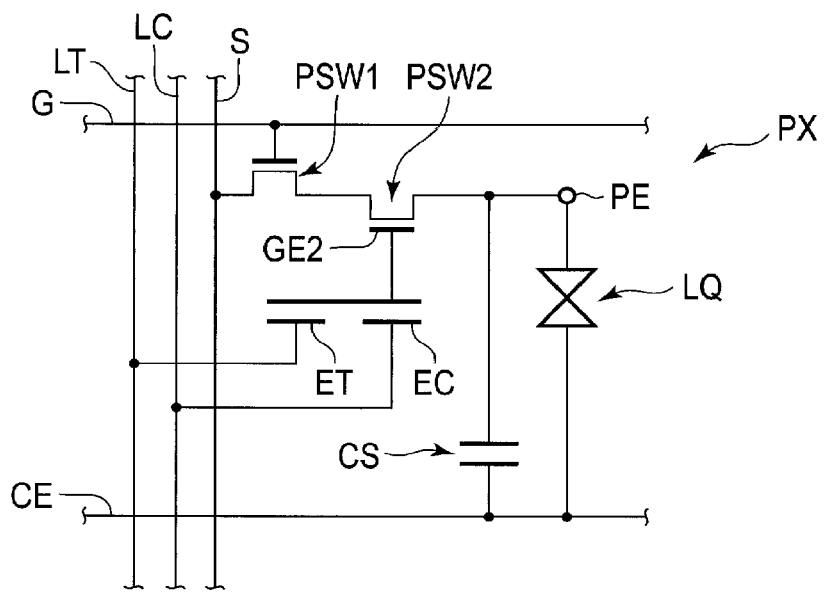
F I G. 11
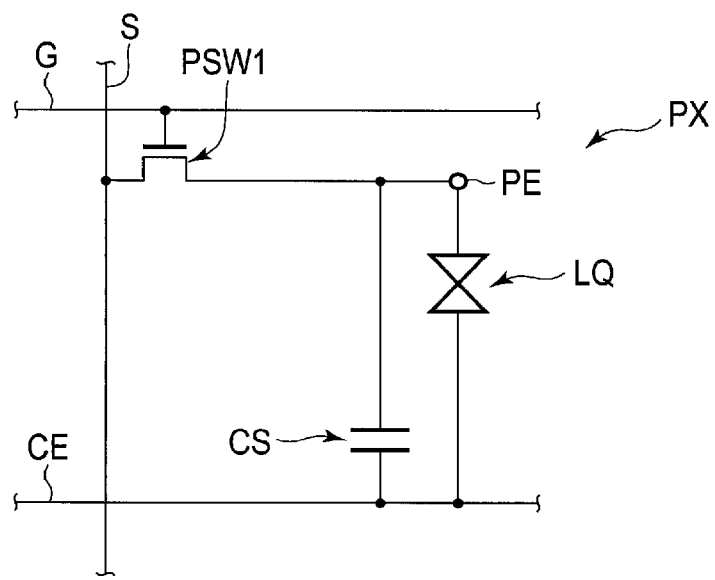
F I G. 12

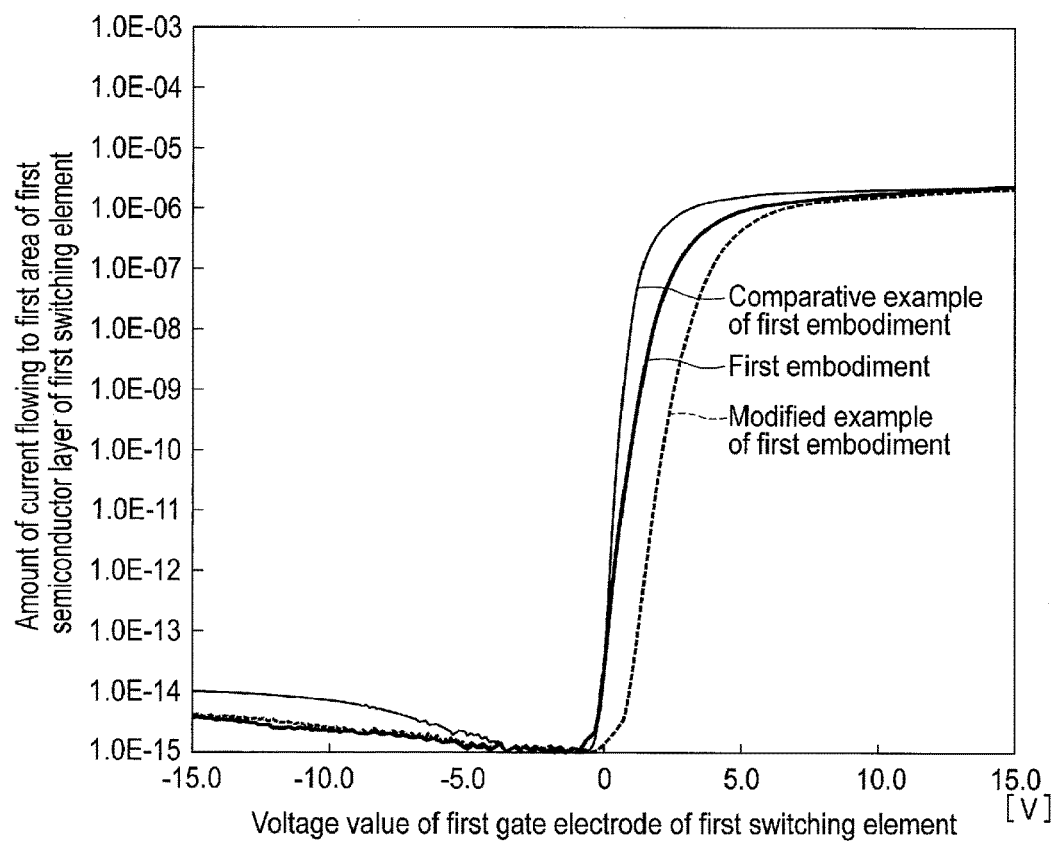
F I G. 13

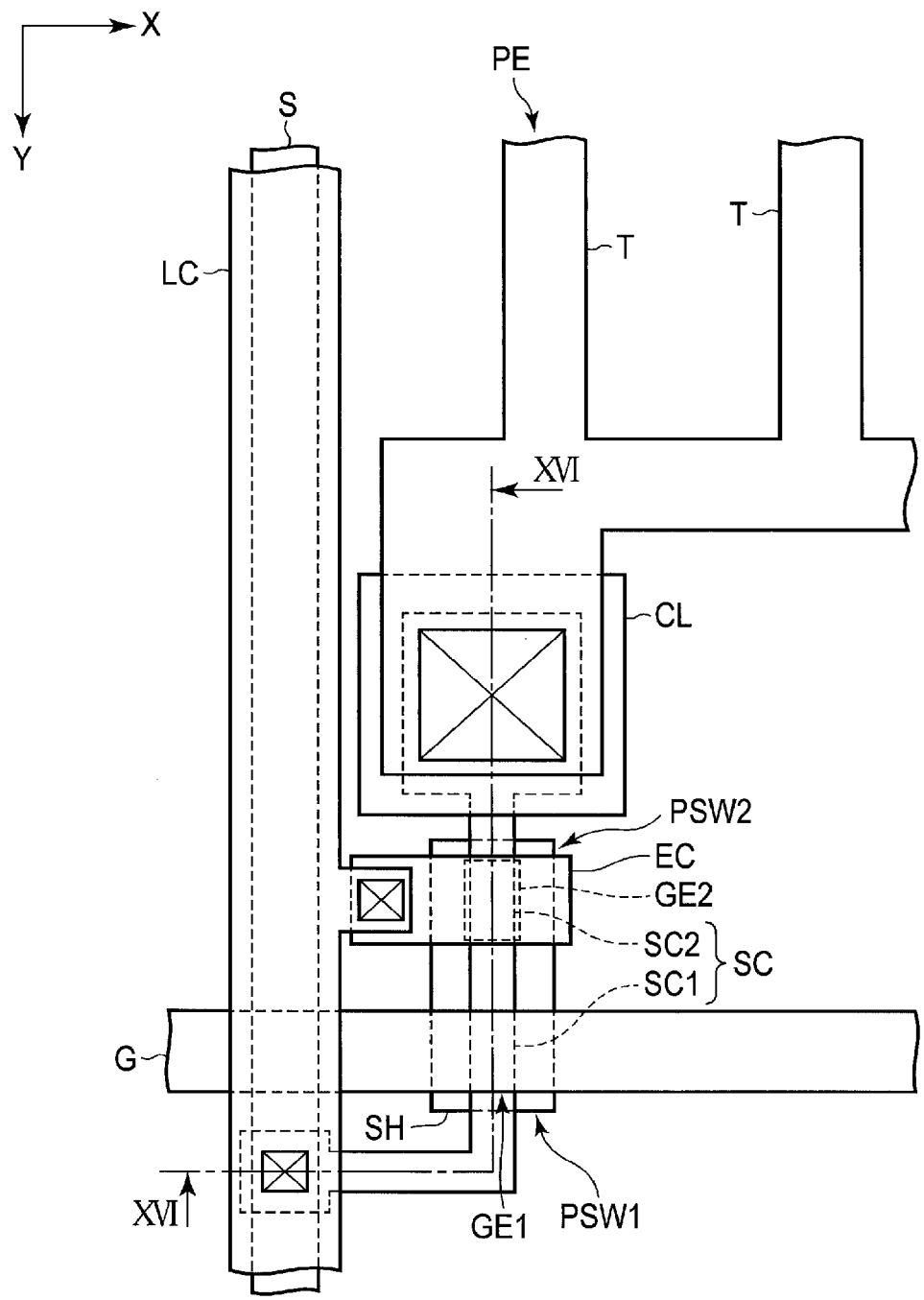
F I G. 15

DISPLAY DEVICE

CROSS-REFERENCE TO RELATED APPLICATIONS

This application is based upon and claims the benefit of priority from Japanese Patent Application No. 2015-121976, filed Jun. 17, 2015, the entire contents of which are incorporated herein by reference.

FIELD

Embodiments described herein relate generally to a display device.

BACKGROUND

Recently, flat-panel display devices have been greatly developed and, specifically, liquid crystal display devices have been noticed with respect to features such as lightness, slimness and low power consumption. In particular, a structure using a lateral electric field (including a fringe field) such as fringe field switching (FFS) mode, of active-matrix liquid crystal display devices comprising switching elements built in respective pixels, has been noticed. In such a liquid crystal display device of the lateral electric field mode, pixel electrodes and common electrode are formed on an array substrate, and liquid crystal molecules are switched by the lateral electric field substantially parallel to a main surface of the array substrate.

BRIEF DESCRIPTION OF THE DRAWINGS

FIG. 2 is a plan view showing a configuration and an equivalent circuit, of the liquid crystal display device shown in FIG. 1.

FIG. 3 is an equivalent circuit diagram showing a pixel shown in FIG. 2.

FIG. 5 is a plan view showing the structure of a sensor of the first embodiment.

FIG. 7 is an illustration for explaining a principle of an example of a sensing method.

FIG. 11 is an equivalent circuit diagram showing a pixel of the liquid crystal display device of a modified example of the first embodiment.

FIG. 12 is an equivalent circuit diagram showing a pixel of the liquid crystal display device of a comparative example of the first embodiment.

FIG. 13 is a graph showing a variation in an amount of a current flowing in a first region of a first semiconductor layer of a first switching element, relative to a voltage value of a first gate electrode of the first switching element, in each of the first embodiment, the modified example of the first embodiment, and the comparative example of the first embodiment.

FIG. 15 is a plan view showing in part a first substrate of a liquid crystal display device of a third embodiment, illustrating in part a pixel.

DETAILED DESCRIPTION

In general, according to one embodiment, a display device comprising: a first substrate including a scanning line, a control line, a control electrode electrically connected to the control line, a signal line, a pixel electrode, and a first switching element and a second switching element serially connected between the signal line and the pixel electrode, wherein the first switching element comprises a first semiconductor layer, a first gate electrode electrically connected to the scanning line, and a first insulating film disposed between the first semiconductor layer and the first gate electrode, the second switching element comprises a second semiconductor layer, a second gate electrode being electrically in a floating state, and a second insulating film disposed between the second semiconductor layer and the second gate electrode, and the control electrode is overlapped with the second gate electrode.

According to another embodiment, a display device comprising: a first substrate including a scanning line, a conductive light-shielding layer, a signal line, a pixel electrode, and a first switching element and a second switching element serially connected between the signal line and the pixel electrode, wherein the first switching element comprises a first semiconductor layer, a first gate electrode opposed to the first semiconductor layer and electrically connected to the scanning line, and a first insulating film disposed between the first semiconductor layer and the first gate electrode, the second switching element comprises a second semiconductor layer, a second gate electrode opposed to the second semiconductor layer and being electrically in a floating state, and a second insulating film disposed between the second semiconductor layer and the second gate electrode, and the light-shielding layer is located below the first semiconductor layer and the second semiconductor layer, opposed to the first semiconductor layer and the second semiconductor layer, and opposed to at least one of the first gate electrode and the scanning line at a position remote from the first semiconductor layer and the second semiconductor layer.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, and the like of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

First Embodiment

Figure 1:
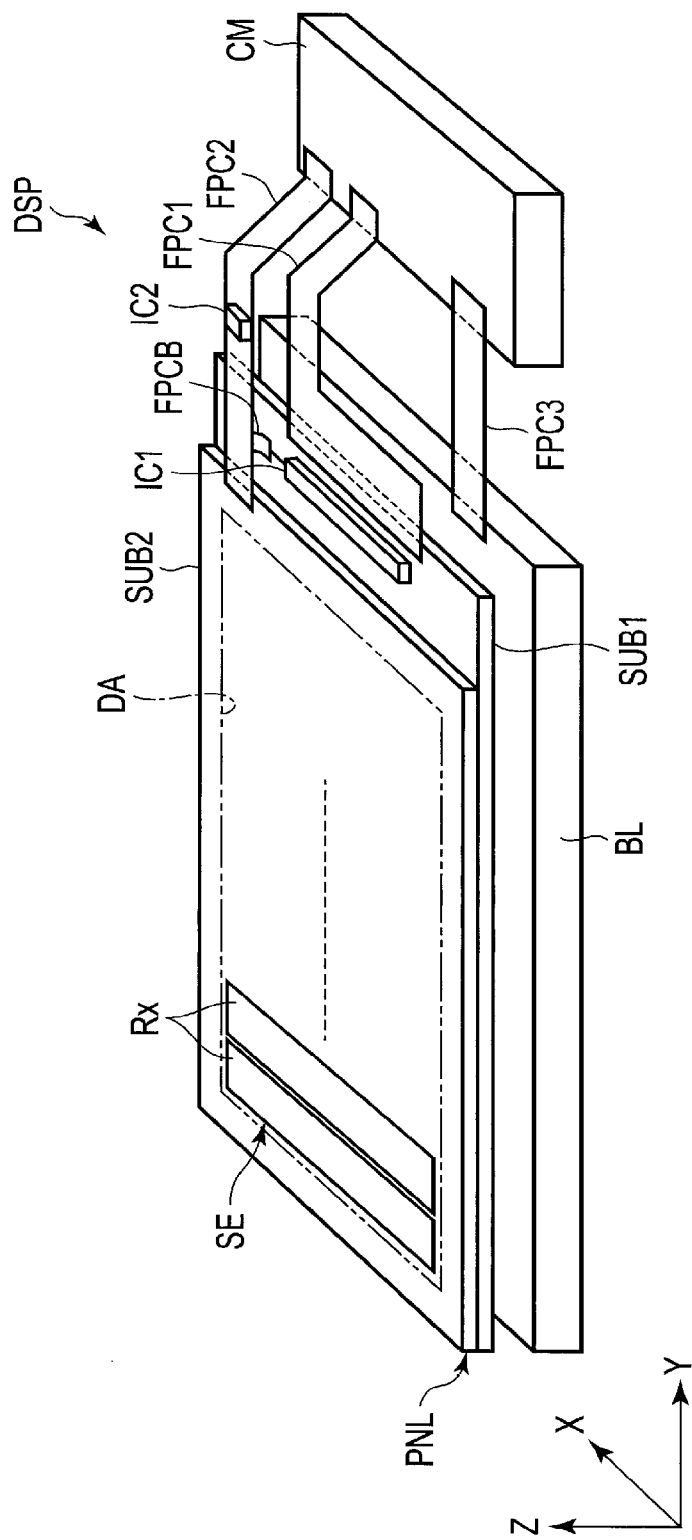
FIG. 1 is a perspective view showing a configuration of the liquid crystal display device of the first embodiment.

First, a display device and its driving method, of a first embodiment, will be explained. In the present embodiment, the display device is assumed to be a liquid crystal display device. It should be noted that the liquid crystal display device of the present embodiment is a sensor-equipped liquid crystal display device. FIG. 1 is a perspective view showing a configuration of the liquid crystal display device of the first embodiment.

As shown in FIG. 1, a liquid crystal display device DSP comprises an active-matrix liquid crystal display panel PNL, a driver IC chip IC1 which drives the liquid crystal display panel PNL, a capacitive sensor SE, a driver IC chip IC2 which drives the sensor SE, a backlight unit BL which illuminates the liquid crystal display panel PNL, a control module CM, flexible printed circuits FPC1, FPC2, and FPC3, and the like.

The liquid crystal display panel PNL includes a first plate-like substrate SUB1, a second plate-like substrate SUB2 opposed to the first substrate SUB1, and a liquid crystal layer (a liquid crystal layer LQ to be explained later) held between the first substrate SUB1 and the second substrate SUB2. In the present embodiment, the first substrate SUB1 can be restated as an array substrate, and the second substrate SUB2 can be restated as a counter-substrate. The liquid crystal display panel PNL includes a display area (active area) DA on which an image is displayed. The liquid crystal display panel PNL is a transmissive liquid crystal display panel having a transmissive display function of displaying an image by selectively transmitting backlight from the backlight unit BL. The liquid crystal display panel PNL may be a reflective liquid crystal display panel having a reflective display function of displaying an image by selectively reflecting light from the display surface such as external light and fill light. In addition, the liquid crystal display panel PNL may be a transflective liquid crystal display panel having the functions of both the transmissive liquid crystal display panel and the reflective liquid crystal display panel.

The backlight unit BL is disposed on a back surface side of the first substrate SUB1. As the backlight unit BL, various types of units are applicable and a backlight unit using a light-emitting diode (LED) as a light source and the like are also applicable, but detailed descriptions of their structures are omitted. If the liquid crystal display panel PNL is a reflective liquid crystal display panel having the reflective display function alone, the backlight unit BL is not disposed.

The sensor SE comprises detection electrodes Rx. The detection electrodes Rx are disposed at, for example, an upper part of an outer surface on a screen side of the liquid crystal display panel PNL on which images are displayed. For this reason, the detection electrodes Rx may be in contact with or remote from the outer surface. In the latter case, a member such as an insulating film is interposed between the outer surface and the detection electrodes Rx. In the present embodiment, the detection electrodes Rx are in contact with the outer surface. The outer surface is opposite to a surface of the second substrate SUB2 which is opposed to the first substrate SUB1, and includes a display surface on which images are displayed. In the example illustrated, the detection electrodes Rx substantially extend in a first direction X so as to be arranged in a second direction Y which intersects the first direction X. The detection electrodes Rx may extend in the second direction Y so as to be arranged in the first direction X or may be formed in an insular shape and arrayed in a matrix in the first direction X and the second direction Y. In the embodiment, the first direction X and the second direction Y are perpendicular to each other. A third direction Z is perpendicular to each of the first direction X and the second direction Y but may intersect the first direction X and the second direction Y at an angle other than 90°.

The driver IC chip IC1 is mounted on the first substrate SUB1 of the liquid crystal display panel PNL. The flexible printed circuit FPC1 connects the liquid crystal display panel PNL with the control module CM. The flexible printed circuit FPC2 connects the detection electrodes Rx of the sensor SE with the control module CM. The driver IC chip IC2 serving as a second driving module is mounted on the flexible printed circuit FPC2. The flexible printed circuit FPC3 connects the backlight unit BL with the control module CM. The control module CM can be restated as an application processor.

The driver IC chips IC1 and IC2 are connected to each other via the flexible printed circuit FPC2 or the like. For example, if the flexible printed circuit FPC2 includes a branch portion FPCB connected onto the first substrate SUB1, the driver IC chips IC1 and IC2 may be connected via the branch portion FPCB and a line on the first substrate SUB1. Alternatively, the driver IC chips IC1 and IC2 may be connected to each other via the flexible printed circuits FPC1 and FPC2.

Either of the driver IC chips IC1 and IC2 can generate a timing signal to inform a driving period of the sensor SE and supply the timing signal to the other driver IC chip.

Alternatively, either of the driver IC chips IC1 and IC2 can generate a timing signal to inform a driving period of a common electrode CE to be explained later and supply the timing signal to the other driver IC chip.

Alternatively, the control module CM can supply timing signals to the driver IC chips IC1 and IC2. Synchronization of driving of the driver IC chip IC1 with driving of the driver IC chip IC2 can be attempted by the timing signals.

FIG. 2 is a plan view showing the configuration and an equivalent circuit, of the liquid crystal display device DSP shown in FIG. 1.

As shown in FIG. 2, the liquid crystal display device DSP comprises the driver IC chip IC1, a scanning line drive circuit GD, a common electrode drive circuit CD serving as a first driving module, and the like, which are located in a non-display area NDA outside the display area DA, as well as the liquid crystal display panel PNL and the like. In the present embodiment, the driver IC chip IC1 comprises a signal line drive circuit SD and a control line drive circuit LD. The driver IC chip IC1 may comprise at least part of the signal line drive circuit SD and the control line drive circuit LD.

In the present embodiment, the display area DA is in a rectangular shape, and the non-display area NDA is in a frame shape (rectangular frame shape) surrounding the display area DA. The non-display area NDA includes a first non-display area A1 in a band shape extending in the second direction Y, a second non-display area A2 in a band shape extending in the second direction Y, a third non-display area A3 in a band shape extending in the first direction X, and a fourth non-display area A4 in a band shape extending in the first direction X. For example, the scanning line drive circuit GD is located in the second non-display area A2, the driver IC chip IC1 is located in the third non-display area A3, and the common electrode drive circuit CD is located in the fourth non-display area A4.

In view of the X-Y plane in which the common electrode drive circuit CD is located on the upper side and the driver IC chip IC1 is located on the lower side, the first non-display area A1 is a right side area of the non-display area NDA, the second non-display area A2 is a left side area of the non-display area NDA, the third non-display area A3 is a lower side area of the non-display area NDA, and the fourth non-display area A4 is an upper side area of the non-display area NDA.

The liquid crystal display panel PNL includes pixels PX in the display area DA. The pixels PX are arrayed in a matrix of m×n in the first direction X and the second direction Y, and the number of the pixels is m×n. Each of m and n is a positive integer. In addition, the liquid crystal display panel PNL includes n scanning lines G (G1 to Gn), m signal lines S (S1 to Sm), the common electrode CE, control lines LC and the like, in the display area DA.

The scanning lines G extend substantially linearly in the first direction X, are led to the outside of the display area DA, and are connected to the scanning line drive circuit GD. In addition, the scanning lines G are spaced apart and arranged in the second direction Y. The signal lines S extend substantially linearly in the second direction Y, are led out to the outside of the display area DA, and are connected to the signal line drive circuit SD. In addition, the signal lines S are spaced apart and arranged in the first direction X, and intersect the scanning lines G. The scanning lines G and the signal lines S may not extend linearly, but part of the lines may be bent.

The common electrode CE is disposed in the display area DA, and is electrically connected to the common electrode drive circuit CD. The common electrode CE is shared by the pixels PX. Details of the common electrode CE will be explained later.

The control lines LC are disposed in the display area DA, and electrically connected to the control line drive circuit LD. The control lines LC are often called control gate lines. The control lines LC are shared by the pixels PX. The control lines LC extend substantially in the second direction Y. In the present embodiment, the control lines LC adjacent in the first direction X are electrically connected in the non-display area NDA, and connected to the control line drive circuit LD in a bundled state. The control line drive circuit LD can thereby electrically control the electrically connected control lines LC together. However, the control lines LC adjacent in the first direction X may be electrically connected in the display area DA or in both the display area DA and the non-display area NDA.

In the present embodiment, the control line drive circuit LD is disposed in the third non-display area A3 and the common electrode drive circuit CD is disposed in the fourth non-display area A4, but their configuration is not limited to this but can be variously modified. For example, the control line drive circuit LD may be disposed in the fourth non-display area A4 and the common electrode drive circuit CD may be disposed in the third non-display area A3. The common electrode drive circuit CD and the control line drive circuit LD are desirably disposed in different areas in consideration of the line layout of the common electrode CE and the control lines LC in the non-display area NDA. However, the common electrode drive circuit CD and the control line drive circuit LD may be disposed in the same area such as the third non-display area A3.

FIG. 3 is an equivalent circuit diagram showing one of the pixels PX shown in FIG. 2.

As shown in FIG. 3, each pixel PX comprises a pixel switch, a pixel electrode PE, a common electrode CE, a control electrode EC, a liquid crystal layer LQ, and the like. The pixel switch comprises switching elements PSW serially connected between the signal line S and the pixel electrode PE.

In the present embodiment, the pixel switch comprises two switching elements, i.e., a first switching element PSW1 and a second switching element PSW2 serially connected between the signal line S and the pixel electrode PE. The first switching element PSW1 is connected between the signal line S and the pixel electrode PE, and the second switching element PSW2 is connected between the first switching element PSW1 and the pixel electrode PE. However, the first switching element PSW1 and the second switching element PSW2 may be located at opposite positions. In other words, the first switching element PSW1 may be connected between the signal line S and the pixel electrode PE, and the second switching element PSW2 may be connected between the signal line S and the first switching element PSW1.

Each of the first switching element PSW1 and the second switching element PSW2 is formed of an N-channel thin-film transistor. However, the second switching element PSW2 may be formed of a P-channel thin-film transistor. In addition, in the present embodiment, each of the first switching element PSW1 and the second switching element PSW2 is formed of a single-gate thin-film transistor. The first switching element PSW1 is electrically connected to the scanning line G and the signal line S. The control electrode EC is electrically connected to the control line LC. The control electrode EC is often called a control gate electrode. A gate electrode of the second switching element PSW2 is subjected to electrostatic capacitive coupling with the control electrode EC. A storage capacitor CS is formed by the common electrode CE, the pixel electrode PE, and an insulating film interposed between the common electrode CE and the pixel electrode PE.

Figure 4:
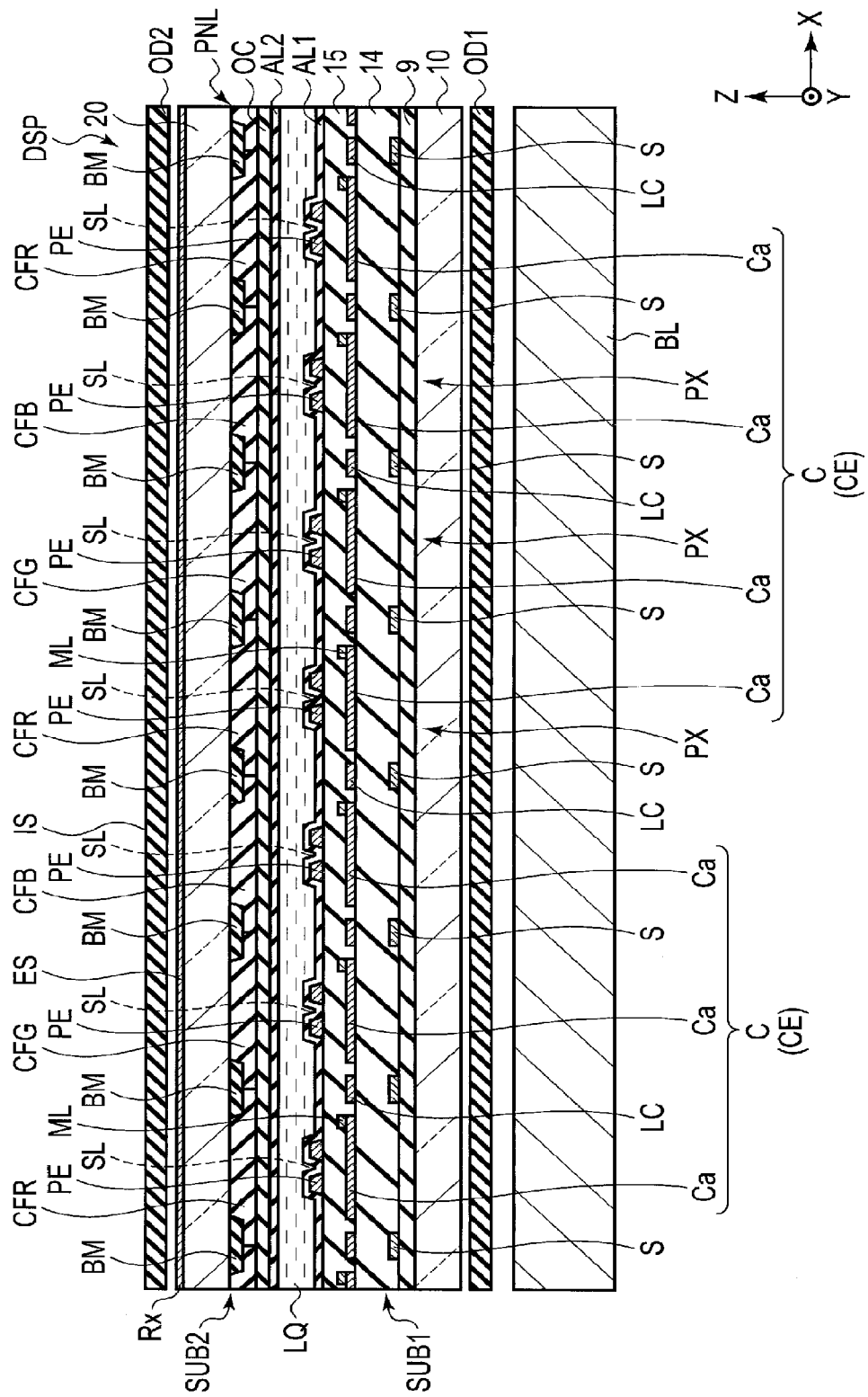
FIG. 4 is a cross-sectional view showing in part the structure of the liquid crystal display device.

FIG. 4 is a cross-sectional view showing in part the structure of the liquid crystal display device DSP.

As shown in FIG. 4, the liquid crystal display device DSP comprises a first optical element OD1, a second optical element OD2 and the like, as well as the liquid crystal display panel PNL and the backlight unit BL. The illustrated liquid crystal display panel PNL has a configuration corresponding to fringe field switching (FFS) mode, i.e., one of in-plane switching (IPS) modes using a lateral electric field substantially parallel to the main surface of the substrate as a display mode, but may have a configuration corresponding to the other display mode. In the display mode using the lateral electric field, for example, a configuration in which both the pixel electrode PE and the common electrode CE are disposed on the first substrate SUB1 is applicable. Alternatively, the liquid crystal display panel PNL may have a configuration corresponding to a mode using a longitudinal electric field mainly generated in a direction intersecting the main surface of the substrate, such as twisted nematic (TN) mode, optically compensated bend (OCB) mode, or vertical aligned (VA) mode. In the display mode using the longitudinal electric field, for example, a configuration in which the pixel electrode PE is disposed on the first substrate SUB1 and the common electrode CE is disposed on the second substrate SUB2 is applicable. The main surface of the substrate is a surface parallel to an X-Y plane defined by the first direction X and the second direction Y.

The liquid crystal display panel PNL includes the first substrate SUB1, the second substrate SUB2 and the liquid crystal layer LQ. The first substrate SUB1 and the second substrate SUB2 are bonded to each other with a predetermined gap formed between the substrates. The liquid crystal layer LQ is held between the first substrate SUB1 and the second substrate SUB2.

The first substrate SUB1 is formed based on a first insulating substrate 10 having a light transmitting property such as a glass substrate or a resin substrate. The first substrate SUB1 includes the signal lines S, the common electrode CE, the pixel electrodes PE, an insulating film 9, a fourth insulating film 14, a fifth insulating film 15, a first alignment film AL1 and the like, on a side of the first insulating substrate 10, which is opposed to the second substrate SUB2. The first substrate SUB1 further includes the scanning lines G, the first switching elements PSW1, the second switching elements PSW2 and the like, though not shown in FIG. 4. The insulating film 9 includes insulating films stacked in a third direction Z, and details of the insulating film 9 will be explained later. The signal lines S are formed on the insulating film 9.

The fourth insulating film 14 is disposed on the signal lines S and the insulating film 9. The common electrode CE is formed on the fourth insulating film 14. Such a common electrode CE is formed of a transparent conductive material such as indium tin oxide (ITO) or indium zinc oxide (IZO). In the example illustrated, the common electrode CE includes divisional electrodes C which can be electrically controlled independently of each other. Each divisional electrode C includes segments Ca. The segments Ca of each divisional electrode C are electrically connected and can be electrically controlled together. The segments Ca of each divisional electrode C are electrically connected in the non-display area NDA, but may be electrically connected in the display area DA or in both the display area DA and the non-display area NDA. A metal layer ML is formed on the divisional electrodes C to reduce the resistance of the divisional electrodes C. For example, the metal layer ML may be formed on each segment Ca to reduce the resistance of each segment Ca.

The control lines LC are formed of a conductive material, on the fourth insulating film 14. Examples of the materials to be used for the control lines LC include a material used for the metal layer ML as the metallic material. In the present embodiment, the control lines LC are formed of the same metallic material as the metal layer ML. For example, the control lines LC and the metal layer ML are formed of MAM. MAM is an abbreviation of molybdenum (Mo), aluminum (Al) and Mo, which indicates a metal layer of a three-layer structure. It should be noted that the control lines LC may be formed of a transparent conductive material, which can be used for the common electrode CE.

The control line LC is opposed to the signal line S and extends along the signal line S. The control lines LC extend parallel to the segments Ca. The control lines LC and the segments Ca are disposed to be spaced apart from each other in the insulation distance.

The fifth insulating film 15 is disposed on the common electrodes CE, the control lines LC, and the fourth insulating film 14. The pixel electrode PE is formed on the fifth insulating film 15. Each pixel electrode PE is located between adjacent signal lines S to be opposed to the common electrode CE. In addition, each pixel electrode PE has a slit SL at a position opposed to the common electrode CE.

The pixel electrodes PE are formed of, for example, a transparent conductive material such as ITO or IZO. The first alignment film AL1 covers the pixel electrodes PE and the fifth insulating film 15.

In contrast, the second substrate SUB2 is formed based on a second insulating substrate 20 having a light transmitting property such as a glass substrate or a resin substrate. The second substrate SUB2 includes a black matrix BM, color filters CFR, CFG, and CFB, an overcoat layer OC, a second alignment film AL2 and the like, on a side of the second insulating substrate 20, which is opposed to the first substrate SUB1.

The black matrix BM is formed on an inner surface of the second insulating substrate 20 and partitions the pixels. Each of the color filters CFR, CFG, and CFB is formed on the inner surface of the second insulating substrate 20 and partially overlaid on the black matrix BM. The color filter CFR is a red color filter arranged in a red pixel and is formed of a red resin material. The color filter CFG is a green color filter arranged in a green pixel and is formed of a green resin material. The color filter CFB is a blue color filter arranged in a blue pixel and is formed of a blue resin material.

In the example illustrated, the unit pixel which is a minimum unit of the color image is composed of three color pixels, i.e., the red pixel, the green pixel, and the blue pixel. However, the unit pixel is not limited to a pixel formed by a combination of the three color pixels. For example, the unit pixel may be composed of four color pixels, i.e., the red pixel, the green pixel, the blue pixel and a white pixel. In this case, a transparent or light-colored filter may be arranged in the white pixel or the filter of the white pixel may be omitted. The overcoat layer OC covers the color filters CFR, CFG, and CFB. The overcoat layer OC is formed of a transparent resin material. The second alignment film AL2 covers the overcoat layer OC.

The detection electrodes Rx are formed above a surface (outer surface) of the second insulating substrate 20. Details of the structure of the detection electrodes Rx will be explained later. In the present embodiment, the detection electrodes Rx are formed of a transparent conductive material such as ITO or IZO. Alternatively, the detection electrodes Rx may be formed by, for example, arranging metal lines as a conductive material. The time required for detection can be reduced by reducing the electric resistance value of the detection electrodes Rx. For this reason, forming the detection electrodes Rx of a metal is beneficial for achievement of a larger size and a higher fineness of the liquid crystal display panel PNL. Alternatively, the detection electrodes Rx may be formed of a combination (aggregate) of a metal (for example, a metal line) and a transparent conductive material (for example, a transparent conductive layer). Each detection electrode Rx is opposed to the common electrode CE via dielectric members such as the fifth insulating film 15, the first alignment film AL1, the liquid crystal layer LQ, the second alignment film AL2, the overcoat layer OC, the color filters CFR, CFG, and CFB, and the second insulating substrate 20.

The first optical element OD1 is interposed between the first insulating substrate 10 and the backlight unit BL. The second optical element OD2 is disposed above the detection electrode Rx. Each of the first optical element OD1 and the second optical element OD2 includes at least a polarizer and may include a retardation film as needed. An absorption axis of the polarizer included in the first optical element OD1 is substantially orthogonal to an absorption axis of the polarizer included in the second optical element OD2. In this example, an input surface IS of the liquid crystal display device DSP is a surface of the second optical element OD2. The liquid crystal display device DSP can detect position information of a portion which a finger or the like contacts or approaches, on the input surface IS.

However, the input surface IS is not limited to the surface of the second optical element OD2, but can be variously modified. For example, if a third insulating substrate different from the first insulating substrate 10 and the second insulating substrate 20 is located on the surface of the liquid crystal display device DSP, the input surface IS is a surface of the third insulating substrate. The third insulating substrate is a substrate having a light transmitting property such as a glass substrate or a resin substrate. If the third insulating substrate is a glass substrate, the third insulating substrate functions as a cover glass.

Next, the capacitive sensor SE of the liquid crystal display device DSP of the present embodiment will be explained. FIG. 5 is a plan view showing a configuration of the sensor SE of the first embodiment. In FIG. 5, illustration of the driver IC chip IC1 and the like is omitted.

As shown in FIG. 5, the sensor SE comprises the detection electrodes Rx and lead lines L on the second substrate SUB2 side. The sensor SE uses the common electrode CE or the control lines LC on the first substrate SUB1 side. In the present embodiment, the sensor SE uses the common electrode CE. In other words, the common electrode CE functions as an electrode for display and also functions as a sensor driving electrode.

The common electrode CE and the detection electrodes Rx are disposed in the display area DA. In the example illustrated, the common electrode CE comprises band-shaped divisional electrodes C which are arranged in the first direction X to be spaced apart from each other and which extend approximately linearly in the second direction Y, in the display area DA. In the present embodiment, the common electrode CE includes j divisional electrodes C (i.e., first divisional electrode C1 to j divisional electrode Cj).

For example, each divisional electrode C is opposed to the pixel electrodes PE of the pixels PX in eight columns. However, each divisional electrode C may be opposed to the pixel electrodes PE of the pixels PX in seven columns or less or nine columns or more. In contrast, each detection electrode Rx is opposed to the pixel electrodes PE of the pixels PX in four columns. However, each detection electrode Rx may be opposed to the pixel electrodes PE of the pixels PX in three columns or less or five columns or more.

The detection electrodes Rx are arranged in the second direction Y to be spaced apart from each other and extend approximately linearly in the first direction X, in the display area DA. In other words, the detection electrodes Rx extend in a direction intersecting the divisional electrodes C. In the present embodiment, the sensor SE comprises k detection electrodes Rx (Rx1 to Rxk). The common electrodes CE (divisional electrodes C extending in the second direction Y) and the detection electrodes Rx extending in the first direction X are opposed to each other with various dielectrics sandwiched between the electrodes as explained above.

The number, size and shape of the divisional electrodes C are not particularly limited and can be variously varied. Alternatively, the common electrodes CE may be arranged in the second direction Y to be spaced apart from each other and extend approximately linearly in the first direction X. In this case, the detection electrodes Rx may be arranged in the first direction X to be spaced apart from each other and extend approximately linearly in the second direction Y.

The lead lines L are disposed in the non-display area NDA. The lead lines L are connected to the detection electrodes Rx in a one-to-one correspondence. Each of the lead lines L allows a sensor output value from the corresponding detection electrode Rx to be output. In the example illustrated, the lead lines L are disposed in the first area A1, or the second area A2 and the third area A3 of the second substrate SUB2. For example, of the lead lines L, the lead lines L connected to odd-numbered detection electrodes Rx are disposed in the second area A2 and the third area A3, and the lead lines L connected to even-numbered detection electrodes Rx are disposed in the first area A1 and the third area A3. The above-explained layout of the lead lines L corresponds to the uniform width in the first direction X of the first area A1 and the second area A2, and the narrow frame of the liquid crystal display device DSP.

The liquid crystal display device DSP further comprises the common electrode drive circuit (first driving module) CD disposed in the non-display area NDA. Each of the divisional electrodes C is electrically connected to the common electrode drive circuit CD. The common electrode drive circuit CD supplies a common drive signal to the common electrodes CE at the display drive for displaying an image, and supplies a sensor drive signal to the common electrodes CE at the sensing drive for sensing.

The flexible printed circuit FPC2 is connected to an outer lead bonding (OLB) pad group disposed above the outer surface of the liquid crystal display panel PNL, in the non-display area NDA. Pads of the OLB pad group are electrically connected to the respective detection electrodes Rx via the lead lines L. In the present embodiment, the lead lines L are formed of a metal, which is a conductive material. The width of the lead lines L can be reduced by forming the lead lines L of a metal material having a much lower electrical resistance value than a transparent conductive material. Since the OLB pad group can be closely assembled at one portion in the third area A3 of the second substrate SUB2, miniaturization of the flexible wiring board FPC2 and reduction in the manufacturing costs can be attempted.

A detection circuit RC is built in, for example, the driver IC chip IC2. The detection circuit RC detects contact or approach of the conductor to the input surface IS of the liquid crystal display device DSP, based on the sensor output values from the detection electrodes Rx. Furthermore, the detection circuit RC can also detect position information of the portion which the conductor has contacted or approached. The detection circuit RC may be disposed in the control module CM.

Figure 6:
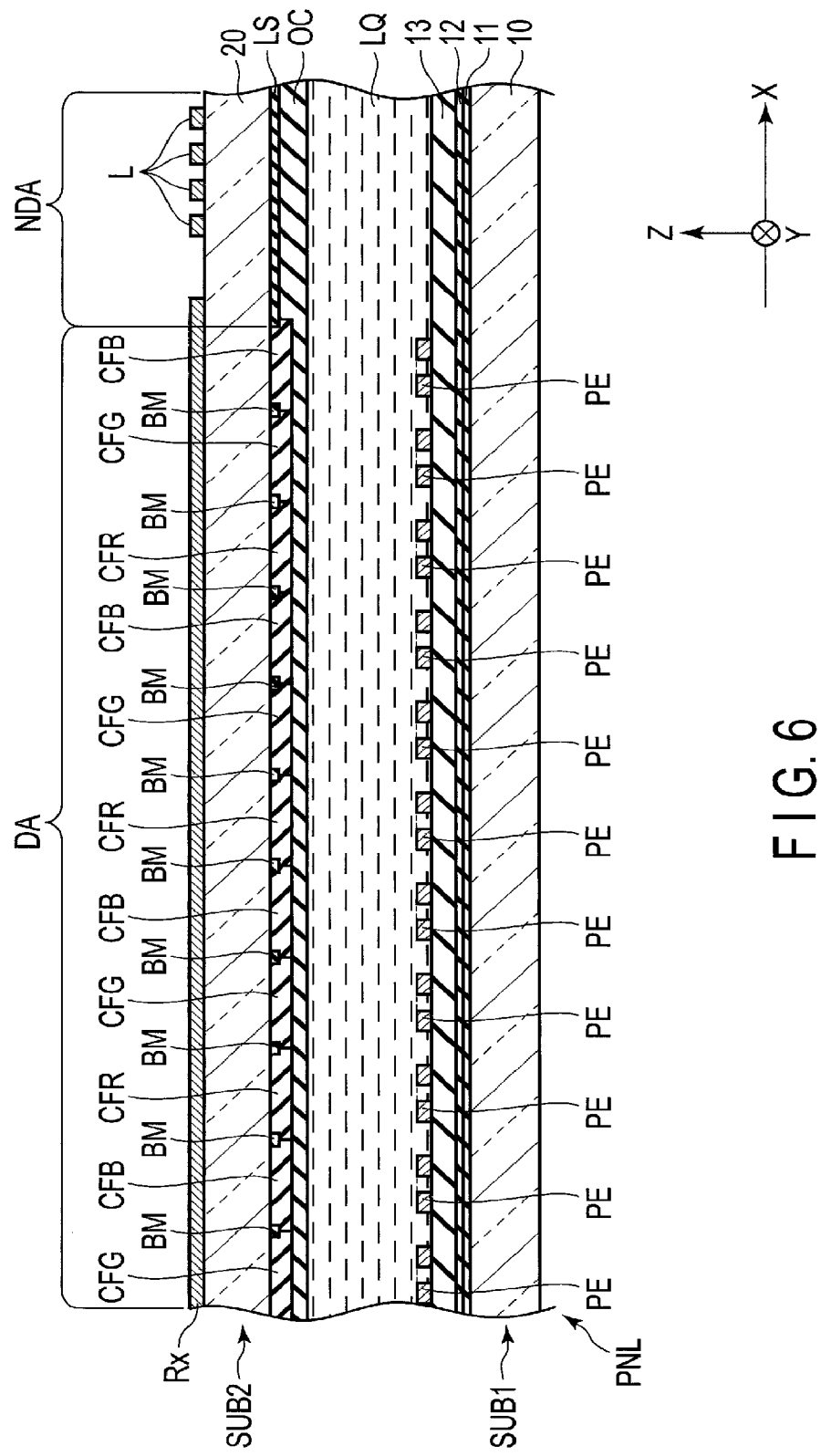
FIG. 6 is a cross-sectional view showing a structure of a liquid crystal display panel including in part the sensor.

FIG. 6 is a cross-sectional view showing the structure of the liquid crystal display panel PNL including in part the sensor SE. Main portions alone necessary for explanations are illustrated. Various lines such as the signal lines, the first alignment film, the second alignment film and the like are not illustrated.

As shown in FIG. 6, the pixel electrodes PE are located on an inner surface side of the first substrate SUB1 which is opposed to the second substrate SUB2. The pixel electrodes PE are formed on the third insulating film 13. The common electrodes CE not illustrated are formed on the second insulating film 12, covered with the third insulating film 13, and opposed to the pixel electrodes PE.

The black matrix BM, the color filters CFR, CFG and CFB, the overcoat layer OC, and a peripheral light-shield layer LS are located on an inner surface side of the second substrate SUB2 which is opposed to the first substrate SUB1. In other words, the color filters CFR, CFG and CFB are formed at positions opposed to the pixel electrodes PE, in the display area DA. The black matrix BM is located at each of boundaries of the color filters CFR, CFG and CFB.

The peripheral light-shielding layer LS is disposed in the non-display area NDA and is formed on the inner surface of the second insulating film 20. The peripheral light-shielding layer LS is formed in a frame shape (rectangular frame shape). The peripheral light-shielding layer LS is formed of the same material as the black matrix BM. The overcoat layer OC extends across the display area DA and the non-display area NDA. The lead lines L are disposed at positions overlaid on the peripheral light-shielding layer LS.

The detection electrodes Rx and the lead lines L are located on the outer side of the second substrate SUB2, which is opposite to the side opposed to the first substrate SUB1. The lead lines L are formed of a metal material such as aluminum (Al), titanium (Ti), silver (Ag), molybdenum (Mo), tungsten (W), copper (Cu) or chromium (Cr). In the present embodiment, the detection electrodes Rx located in the display area DA are formed in a band shape by using ITO as explained above.

Next, a display driving operation performed to display images in the liquid crystal display device DSP of the above-explained FFS mode will be explained.

First, the off-state in which no voltage is applied to the liquid crystal layer LQ will be explained. The off-state corresponds to a state in which a potential difference is not formed between the pixel electrode PE and the common electrode CE. In the off-state, liquid crystal molecules in the liquid crystal layer LQ are subjected to initial alignment in the single orientation in the X-Y plane by the alignment restriction force between the first alignment film AL1 and the second alignment film AL2. Part of backlight from the backlight unit BL is transmitted through the polarizer of the first optical element OD1 and is made incident on the liquid crystal display panel PNL. The light incident on the liquid crystal display panel PNL is linearly polarized light orthogonal to an absorption axis of the polarizer. The polarized state of the linearly polarized light is hardly changed when passed though the liquid crystal display panel PNL in the off-state. For this reason, most of the linearly polarized light which have transmitted through the liquid crystal display panel PNL is absorbed by the polarizer of the second optical element OD2 (black display). A mode in which the liquid crystal display panel PNL thus becomes a black display in the off state is called a normally black mode.

Next, the on-state in which a voltage is applied to the liquid crystal layer LQ will be explained. The on-state corresponds to a state in which a potential difference is formed between the pixel electrodes PE and the common electrode CE. In other words, a common drive signal (common voltage) is supplied from the common electrode drive circuit CD to the common electrode CE. In contrast, a video signal (image signal) to form a potential difference relative to the common voltage is supplied to the pixel electrodes PE. A fringing field is thereby formed between the pixel electrodes PE and the common electrode CE, in the on-state.

In this on-state, the liquid crystal molecules are aligned in the orientation different from that of the initial alignment in the X-Y plane. In the on-state, the linearly polarized light orthogonal to the absorption axis of the polarizer of the first optical element OD1 is made incident on the liquid crystal display panel PNL, and its polarized state is varied in accordance with the alignment state of the liquid crystal molecules when passed through the liquid crystal layer LQ. For this reason, in the on-state, at least part of the light which has passed through the liquid crystal layer LQ is transmitted through the polarizer of the second optical element OD2 (white display).

Next, a sensing drive operation of sensing to detect contact or approach of the conductor to the input surface IS of the above-explained liquid crystal display device DSP will be explained. In other words, a sensor drive signal is supplied from the common electrode drive circuit CD to the common electrode CE. Sensing is preformed by allowing the detection electrodes Rx to receive a sensor signal from the common electrode CE, in this state.

A principle in an example of a sensing method will be explained with reference to FIG. 7.

As shown in FIG. 7, the detection electrodes Rx are disposed in at least the display area DA. A capacitance Cc exists between the divisional electrode C and the detection electrode Rx. In other words, the detection electrode Rx is subjected to electrostatic capacitive coupling with the divisional electrode C (common electrode CE). A pulse-like write signal (sensor drive signal) Vw is supplied to each of the divisional electrodes C, sequentially, in a predetermined cycle. In this example, the user's finger is assumed to be present closely to a position where a specific detection electrode Rx and a specific divisional electrode C intersect. A capacitance Cx is generated by the user's finger close to the detection electrode Rx. When the pulse-like write signal Vw is supplied to the divisional electrodes C, a pulse-like read signal (sensor output value) Vr of a voltage level different from levels of pulses obtained from the other detection electrodes is obtained from the specific detection electrode Rx. In other words, when input position information which is the position information of the user's finger in the display area DA is detected, the common electrode drive circuit CD serving as the first driving module supplies the write signal Vw to the divisional electrodes C (common electrodes CE) and allows the sensor signal to be generated between the divisional electrodes C and the detection electrodes Rx. The driver IC chip IC2 serving as the second driving module is connected to the detection electrodes Rx to read the read signal Vr indicating variation of the sensor signal (for example, the electrostatic capacitance generated at the detection electrodes Rx).

The detection circuit RC shown in FIG. 5 can detect two-dimensional position information of the finger in the X-Y plane of the sensor SE, based on the timing of supplying the write signal Vw to the divisional electrodes C and on the read signal Vr from each of the detection electrodes Rx. In addition, the capacitance Cx obtained when the finger is close to the detection electrode Rx is different from that obtained when the finger is remote from the detection electrode Rx. For this reason, the voltage level of the read signal Vr obtained when the finger is close to the detection electrode Rx is different from that obtained when the finger is remote from the detection electrode Rx. Therefore, the detection circuit RC can also detect the proximity of the finger to the sensor SE (i.e., a distance in a normal direction of the sensor SE), based on the voltage level of the read signal Vr.

The display drive and the sensing drive are performed within, for example, one frame period. For example, one frame period is divided into a first period and a second period. During the first period, the display drive of writing video signals to all the pixels of the display area DA is performed in time division (display period). During the second period following the first period, the sensing drive of detecting an object in the entire display area DA is performed in time division (touch detection period or sensing period).

In another example, one frame period is further divided into plural periods. The display area DA is divided into plural blocks, and the display drive and the sensing drive are performed for each block. In other words, in the first period of one frame period, a first display drive of writing video signals to pixels of the first display block in the display area DA is performed. During the second period following the first period, a first sensing drive of detecting the object (conductor) in a first sensing block in the display area DA is performed. The first sensing block and the first display block may be the same area or different area. During the third period following the second period, a second display drive of writing video signals to pixels of the second display block different from the first display block is performed. During the fourth period following the third period, a second sensing drive of detecting the object in a second sensing block different from the first sensing block is performed. Thus, the object can be detected in the entire display area DA while alternately performing the display drive and the sensing drive within one frame period and writing the video signals to all the pixels of the display area DA.

Next, a configuration of a pixel PX will be explained.

Figure 8:
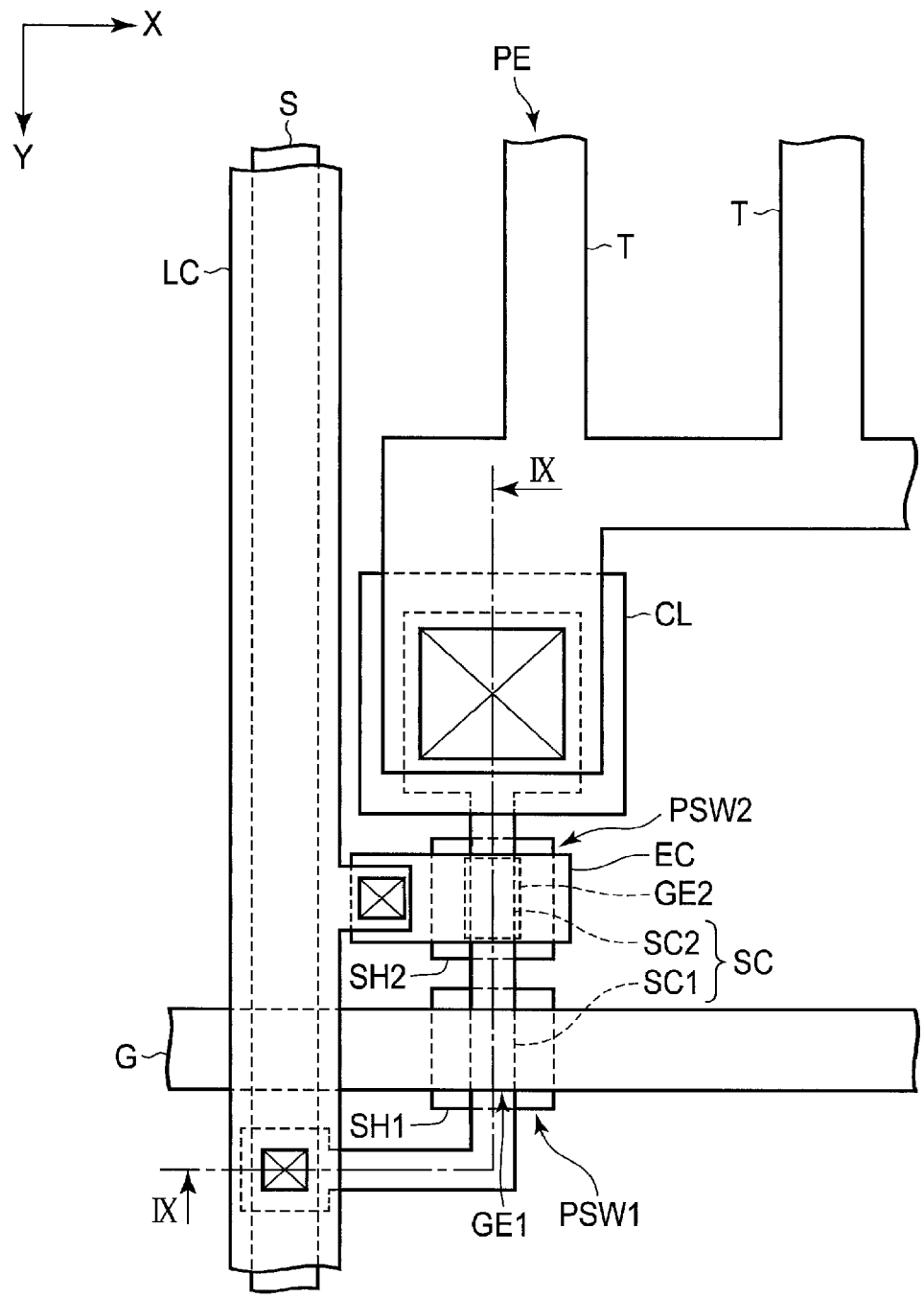
FIG. 8 is a plan view showing in part a first substrate of the liquid crystal display panel, illustrating in part a pixel.

FIG. 8 is a plan view showing in part the first substrate SUE1 of the liquid crystal display panel PNL, illustrating in part a pixel PX. As shown in FIG. 8, the first switching element PSW1 and the second switching element PSW2 are serially connected between the signal line S and the pixel electrode PE.

The first switching element PSW1 includes a first semiconductor layer SC1, a first gate electrode GE1, and a first gate insulating film. The first gate insulating film is often called a first interlayer insulating film, a first insulating film or a first insulating layer. The first gate electrode GE1 is opposed to the first semiconductor layer SC1 and is electrically connected to a scanning line G. In the present embodiment, the first gate electrode GE1 is formed by a part of the scanning line G. The first gate insulating film is disposed between the first semiconductor layer SC1 and the first gate electrode GE1. In the present embodiment, the first gate insulating film is formed by a second insulating film 12 which will be explained later.

The second switching element PSW2 includes a second semiconductor layer SC2, a second gate electrode GE2, and a second gate insulating film. The second gate insulating film is often called a second interlayer insulating film, a second insulating film or a second insulating layer. The second gate electrode GE2 is opposed to the second semiconductor layer SC2 and is electrically in a floating state. The second gate electrode GE2 is often called a floating-gate electrode. The second gate insulating film is disposed between the second semiconductor layer SC2 and the second gate electrode GE2. In the present embodiment, the second gate insulating film is formed by a second insulating film 12 which will be explained later.

In the present embodiment, the first semiconductor layer SC1 and the second semiconductor layer SC2 are formed integrally to constitute the semiconductor layer SC. The first semiconductor layer SC1 is electrically connected to the signal line S, and the second semiconductor layer SC2 is electrically connected to the pixel electrode PE. The semiconductor layer SC is shaped in a laterally reversed L letter in view of the X-Y plane in which the second switching element PSW2 is located on an upper side and the first switching element PSW1 is located on a lower side.

The first light-shielding layer SH1 is opposed to the first channel region which is opposed to the first gate electrode GE1, in the first semiconductor layer SC1. In the present embodiment, the area of the first light-shielding layer SH1 is larger than the area of the first channel region of the first semiconductor layer SC1, and the entire first channel region of the first semiconductor layer SC1 is opposed to the first light-shielding layer SH1.

The second light-shielding layer SH2 is opposed to the second channel region which is opposed to the second gate electrode GE2, in the second semiconductor layer SC2. In the present embodiment, the area of the second light-shielding layer SH2 is larger than the area of the second channel region of the second semiconductor layer SC2, and the entire second channel region of the second semiconductor layer SC2 is opposed to the second light-shielding layer SH2.

In the present embodiment, the first light-shielding layer SH1 and the second light-shielding layer SH2 are formed of a metal and spaced apart from each other in an insulation distance. However, the first light-shielding layer SH1 and the second light-shielding layer SH2 may be formed of not a metal, but a material having a light shielding property. In addition, the first light-shielding layer SH1 and the second light-shielding layer SH2 may be disposed as needed.

The control electrode EC is opposed to the second gate electrode GE2. The second gate electrode GE2 is subjected to electrostatic capacitive coupling with the control electrode EC. In the present embodiment, the area of the control electrode EC is larger than the area of the second gate electrode GE2, and the entire second gate electrode GE2 is opposed to the control electrode EC.

The control line LC is opposed to the signal line S and extends along the signal line S. The control line LC is electrically connected to the control electrode EC. The control line LC has a protruding portion, which is opposed to the control electrode EC to be in contact with the control electrode EC through a contact hole formed in the fourth insulating film 14.

The pixel electrode PE is electrically connected to the semiconductor layer SC through a conductive layer CL. However, the pixel electrode PE may be electrically connected to the semiconductor layer SC. The pixel electrode PE may be connected to the semiconductor layer SC through a conductive member other than the conductive layer CL or may be connected to the semiconductor layer SC, not through the conductive layer CL.

The pixel electrode PE comprises comb electrodes T. The comb electrodes T extend parallel to each other, substantially in the second direction Y. In the present embodiment, the comb electrodes T extend in the second direction Y, along the signal line S. However, the comb electrodes T may extend in a direction angled from the second direction Y. For example, if a portion of the signal line S which is close to the comb electrodes T extends in a direction angled from the second direction Y, the portion of the signal line S and the comb electrodes T may extend parallel to each other, in the direction angled from the second direction Y.

Figure 9:
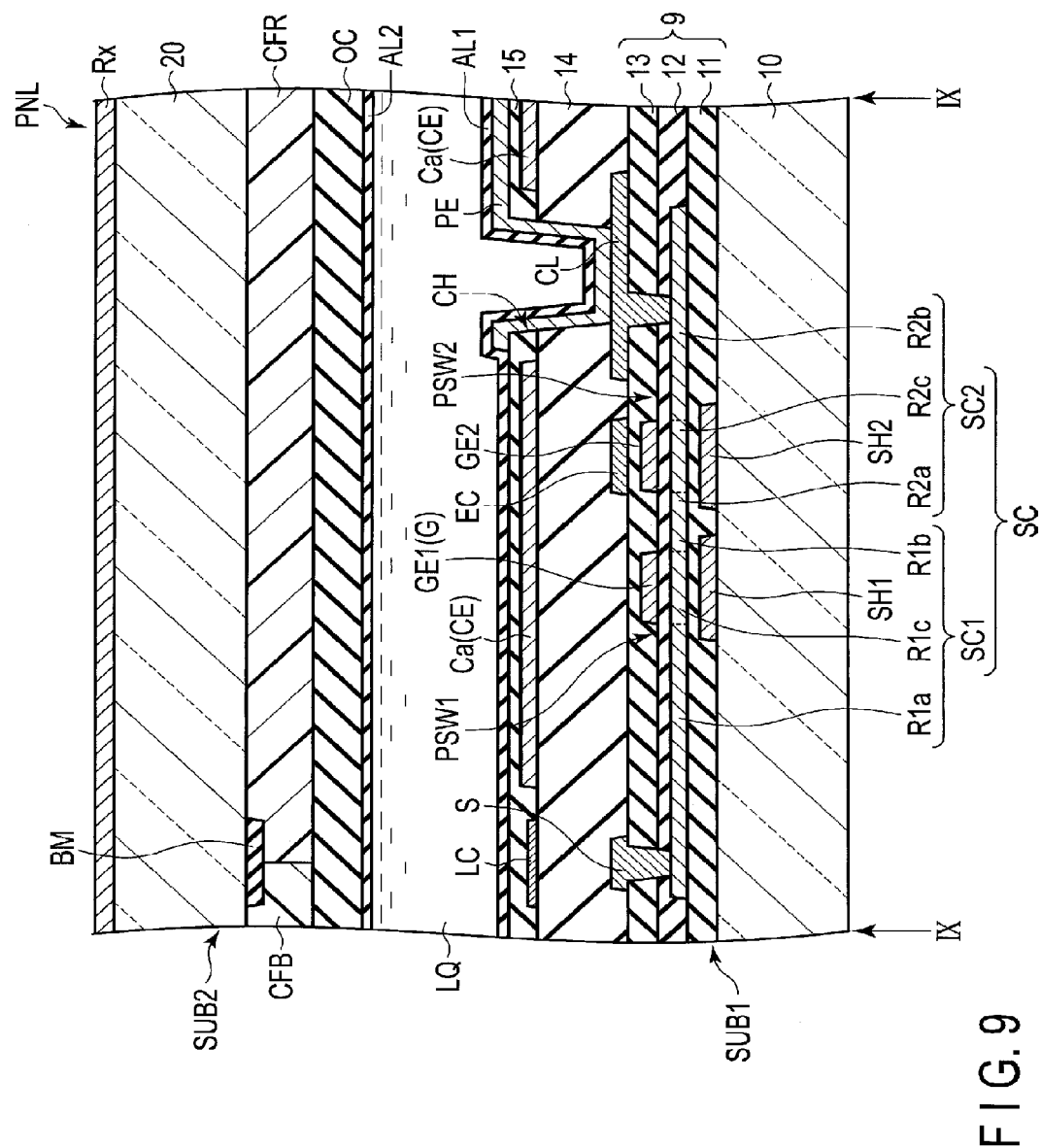
FIG. 9 is a cross-sectional view showing the liquid crystal display panel as seen along line IX-IX of FIG. 8.

FIG. 9 is a cross-sectional view showing the liquid crystal display panel PNL as seen along line Ix-Ix of FIG. 8. As shown in FIG. 9, the first substrate SUB1 is formed by using the first insulating substrate 10. The first substrate SUB1 includes the first insulating film 11, the second insulating film 12, the third insulating film 13, the fourth insulating film 14, the fifth insulating film 15, the first switching element PSW1, the second switching element PSW2, the pixel electrode PE, the common electrodes CE, the first alignment film AL1, and the like. In the present embodiment, each of the first switching element PSW1 and the second switching element PSW2 is formed of a thin-film transistor of a top-gate structure.

The first light-shielding layer SH1 and the second light-shielding layer SH2 are formed on the first insulating substrate 10. The first insulating film 11 is formed on the first insulating substrate 10, the first light-shielding layer SH1 and the second light-shielding layer SH2. The first insulating film 11 is often called an undercoat insulating film. The semiconductor layer SC is formed on the first insulating film 11. The semiconductor layer SC is formed of, for example, polycrystalline silicon, but may be formed of amorphous silicon, an oxide semiconductor or the like. The semiconductor layer SC includes the first semiconductor layer SC1 and the second semiconductor layer SC2.

The first semiconductor layer SC1 includes a first region R1$a$, a second region R1$b$, and a third region R1$c$ located between the first region R1$a$ and the second region R1$b$. The third region R1$c$ is the above-explained first channel region. The second semiconductor layer SC2 includes a fourth region R2$a$ region R2$a$, a fifth region R2$b$, and a sixth region R2$c$ located between the fourth region R2$a$ and the fifth region R2$b$. The sixth region R2$c$ is the above-explained second channel region. The second region R1$b$ and the fourth region R2$a$ share a partial region of the semiconductor layer SC.

The second insulating film 12 is formed on the first insulating film 11 and the semiconductor layer SC. The second insulating film 12 is often called a gate insulating film. In the present embodiment, the second insulating film 12 forms the first gate insulating film and the second gate insulating film. The scanning line G, the first gate electrode GE1 and the second gate electrode GE2 are formed on the second insulating film 12. The first gate electrode GE1 is opposed to the third region R1$c$, and the second gate electrode GE2 is opposed to the sixth region R2$c$.

The third insulating film 13 is formed on the scanning line G, the first gate electrode GE1, the second gate electrode GE2 and the second insulating film 12. The first insulating film 11, the second insulating film 12, and the third insulating film 13 form the insulating film 9. The signal line S, the conductive layer CL, and the control electrode EC are formed on the third insulating film 13. The signal line S is in contact with the first region R1$a$ of the first semiconductor layer SC1 through a contact hole which penetrates the second insulating film 12 and the third insulating film 13. The conductive layer CL is in contact with the fifth region R2$b$ of the second semiconductor layer SC2 through another contact hole which penetrates the second insulating film 12 and the third insulating film 13. The control electrode EC is opposed to the second gate electrode GE2.

The fourth insulating film 14 is formed on the third insulating film 13, the signal line S, the conductive layer CL, and the control electrode EC. The segment Ca (common electrode CE) and the control line LC are formed on the fourth insulating film 14. The segment Ca is formed to be spaced apart from the contact hole CH. The control line LC is opposed to the signal line S. The fifth insulating film 15 is formed on the fourth insulating film 14, the common electrode CE, and the control line LC. Each of the first insulating film 11, the second insulating film 12, the third insulating film 13, and the fifth insulating film 15 is formed of an inorganic material such as a silicon nitride (SiN) or a silicon oxide (SiO). The fourth insulating film 14 is formed of, for example, an organic material such as an acrylic resin.

The pixel electrode PE is formed on the fifth insulating film 15. The pixel electrode PE is opposed to the segment Ca. The pixel electrode PE is in contact with the conductive layer CL through the contact hole CH which penetrates the fourth insulating film 14 and the fifth insulating film 15. The common electrode CE, the pixel electrode PE and the control line LC are formed of a conductive material. For example, the common electrode CE and the pixel electrode PE are formed of a transparent, electrically conductive material such as indium zinc oxide (IZO) or indium tin oxide (ITO). The control line LC is formed of the same metallic material as the metal layer ML. The first alignment film AL1 is formed on the fifth insulating film 15 and the pixel electrode PE. The first alignment film AL1 is formed of, for example, a material having a horizontal alignment property.

The second substrate SUB2 is formed by using the second insulating substrate 20. The second substrate SUB2 includes the black matrix BM, the color filters CFR and CFB, the overcoat layer OC, the second alignment film AL2 and the like. The black matrix BM is formed at a position opposed to the signal lines S and the scanning lines G. A side of each of the color filters CFR and CFB is overlaid on the black matrix BM. The second alignment film AL2 is formed on a side of the overcoat layer OC, which is opposed to the first substrate SUB1. The alignment film AL2 is formed of a material having a horizontal alignment property.

In the example illustrated, the color filters CFR, CFG and CFB are formed on the second substrate SUB2, but may be formed on the first substrate SUB1.

Next, a method of driving the liquid crystal display device DSP of the first embodiment will be explained in detail.

Figure 10:
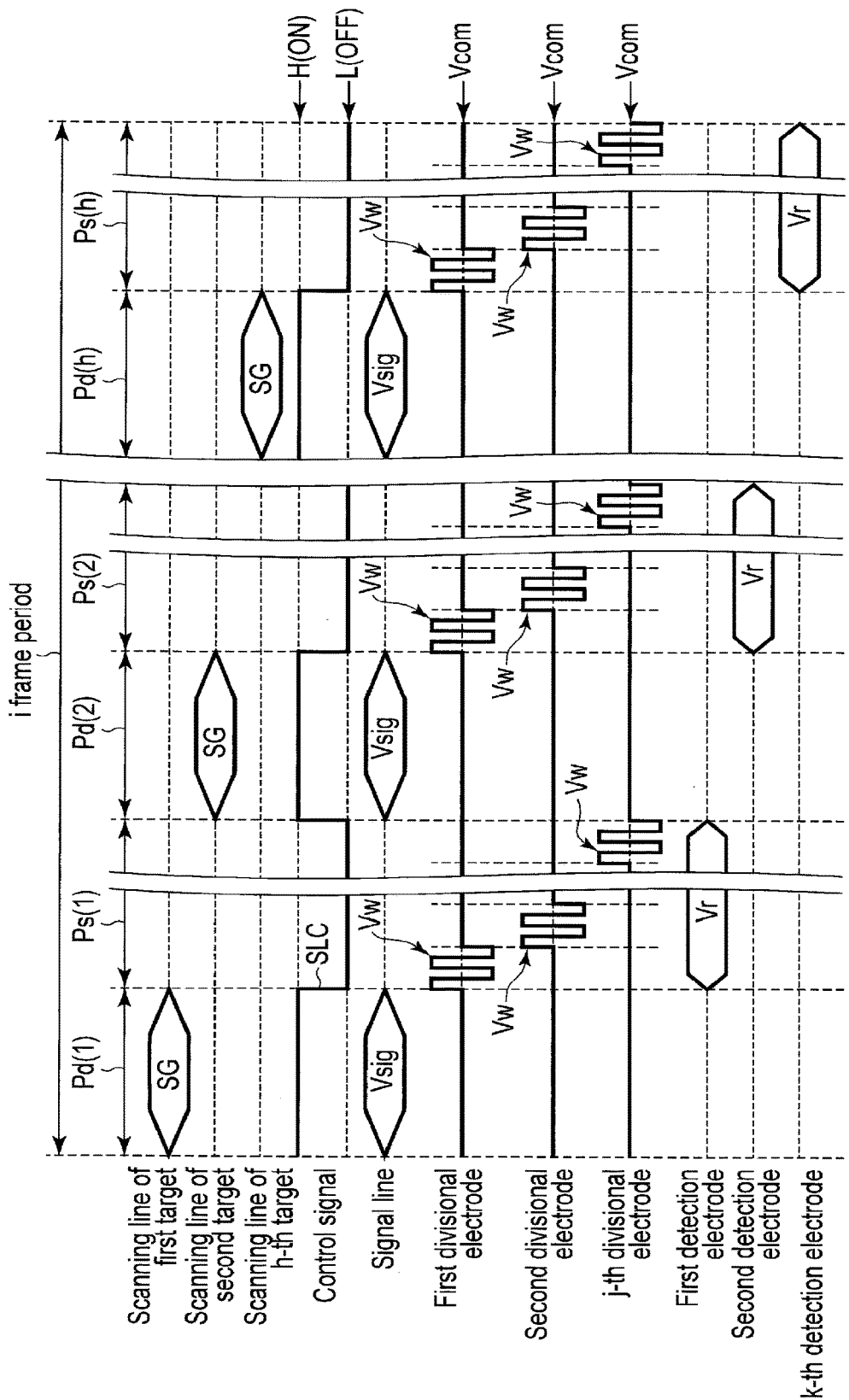
FIG. 10 is a timing chart for explaining a method of driving the liquid crystal display device of the first embodiment, illustrating a control signal, a video signal, a common drive signal, a write signal, and a read signal during an arbitrary i-frame period.

FIG. 10 is a timing chart for explaining a method of driving the liquid crystal display device of the first embodiment, illustrating a control signal SG, a control signal SLC, a video signal Vsig, a common drive signal Vcom, a write signal Vw, and a read signal Vr, during an arbitrary i-frame period.

A method of driving the liquid crystal display device DSP during the i-frame period which is an arbitrary i-th frame (1F) period will be explained here.

As shown in FIG. 10, the driver IC chip IC1, the driver IC chip IC2, the scanning line drive circuit GD, the common electrode drive circuit CD, and the control module CM repeat the display drive performed during the display drive period Pd and the sensing drive performed during the sensing period (input position information detection period) Ps excluded from the display drive period Pd, during the i-frame period, in the present embodiment. The sensing period Ps is, for example, a blanking period in which the display drive is suspended. Examples of the blanking period include a horizontal blanking period, a vertical blanking period and the like. In addition, at least one detection electrode Rx can be handled as a target of the sensing drive during each sensing period.

In the present embodiment, the display area DA is divided into h targets (blocks), and the display drive and the sensing drive are performed for each target. The targets are opposed to respective detection electrodes Rx. In other words, the number h of targets is equal to the number k of the detection electrodes Rx (h=k). The area of the target where the display drive is performed is the same as the area of the target where the sensing drive is performed successively with the display drive.

During a first display drive period Pd(1) of the frame period, a first display drive of writing the video signal Vsig to the pixels PX of a first target opposed to the first detection electrode Rx1 is performed. During a first sensing period Ps(1) following the display drive period Pd(1), a first sensing drive of performing the sensing drive for the first detection electrode Rx1 and all the divisional electrodes C1 to Cj and detecting the object (conductor) in the area of the first target is performed.

During a second display drive period Pd(2) following the sensing period Ps(1), a second display drive of writing the video signal Vsig to the pixels PX of a second target opposed to the second detection electrode Rx2 is performed. During a second sensing period Ps(2) following the display drive period Pd(2), a second sensing drive of performing the sensing drive for the second detection electrode Rx2 and all the divisional electrodes C1 to Cj and detecting the object (conductor) in the area of the second target is performed.

During the last h-th display drive period Pd(h), an h-th display drive of writing the video signal Vsig to the pixels PX of an h-th target opposed to the k-th detection electrode Rxk is performed. During the last h-th sensing period Ps(h) following the display drive period Pd(h), an h-th sensing drive of performing the sensing drive for the k-th detection electrode Rxk and all the divisional electrodes C1 to Cj and detecting the object (conductor) in the area of the h-th target is performed.

Thus, the object can be detected in the entire display area DA while alternately performing the display drive and the sensing drive within one frame period and writing the video signal to all the pixels of the display area DA.

During the display drive period Pd, the control signal SG is supplied from the scanning line drive circuit GD to the scanning lines G, the video signal Vsig is supplied from the signal line drive circuit SD to the signal lines S, the common drive signal Vcom is supplied from the common electrode drive circuit CD to the common electrodes CE (divisional electrodes C), and the control signal SLC is supplied from the control line drive circuit LD to the control lines LC, and the liquid crystal display panel PNL is driven. For example, a high (H)-level voltage value of the control signal SLC to switch the second switching element PSW2 to the conductive state is equal to a high-level voltage value of the control signal SG to switch the first switching element PSW1 to the conductive state.

More specifically, during the display drive period Pd(1) of the i-frame period, the control signal SG is supplied to the scanning lines G of the first target, the video signal Vsig is supplied to the signal lines S1 to Sm, the common drive signal Vcom is supplied to all the divisional electrodes C, and the high-level control signal SLC is supplied to all the control electrodes EC via the control lines LC, and the pixels PX of the first target are driven. The high-level control signal SLC is supplied to all the control electrodes EC for convenience of the line layout in the present embodiment, but may be supplied to the control electrodes EC alone of the pixels PX of the first target. The second switching elements PSW2 of the pixels PX of the first target can be thereby switched to be in the conductive state.

After that, during the display drive period Pd(2), the control signal SG is supplied to the scanning lines G of the second target, the video signal Vsig is supplied to the signal lines S1 to Sm, the common drive signal Vcom is supplied to all the divisional electrodes C, and the high-level control signal SLC is supplied to all the control electrodes EC via the control lines LC, and the pixels PX of the second target are driven. In this case, too, the second switching elements PSW2 of the pixels PX of the second target may also be able to be switched to be in the conductive state by supplying the high-level control signal SLC to the control electrodes EC of the pixels PX of the second target.

Then, during the display drive period Pd(h), the control signal SG is supplied to the scanning lines G of the h-th target, the video signal Vsig is supplied to the signal lines S1 to Sm, the common drive signal Vcom is supplied to all the divisional electrodes C, and the high-level control signal SLC is supplied to all the control electrodes EC via the control lines LC, and the pixels PX of the h-th target are driven. In this case, too, the second switching elements PSW2 of the pixels PX of the h-th target may also be able to be switched to be in the conductive state by supplying the high-level control signal SLC to the control electrodes EC of the pixels PX of the h-th target.

During In the sensing period Ps, inputting the control signal SG and the video signal Vsig to the liquid crystal display panel PNL is stopped, a low (L)-level control signal SLC is supplied to all the control electrodes EC via the control lines LC, and the sensor SE is driven. The first switching elements PSW1 and the second switching elements PSW2 of all the pixels PX can be thereby switched to be in the nonconductive state.

More specifically, during the sensing period Ps(1) of the i-frame period, inputting the control signal SG and the video signal Vsig is stopped, the low-level control signal SLC is supplied to all the control electrodes EC via the control lines LC, the write signal Vw is written sequentially to the first to j-th divisional electrodes C1 to Cj, and the read signal Vr is read from the first detection electrode Rx1. For example, the write signal Vw is a pulse signal having a high frequency of MHz order and an amplitude of approximately 2V. The input position information in the area of the first target is thereby determined based on the read signal Vr.

It should be noted that the write signal Vw is a pulse signal. The high-level voltage value of the write signal Vw is a voltage value higher than the voltage value of the common drive signal Vcom, and the low-level voltage value of the write signal Vw is a voltage value lower than the voltage value of the common drive signal Vcom. An absolute value of a difference between the high-level voltage value of the write signal Vw and the voltage value of the common drive signal Vcom is equal to an absolute value of a difference between the voltage value of the common drive signal Vcom and the low-level voltage value of the write signal Vw. The voltage value of the write signal Vw at a point at which the amplitude becomes 50% of the maximum amplitude is equal to the voltage value of the common drive signal Vcom. For this reason, shift in the potential of the pixel electrodes PE caused by potential variation of the divisional electrodes C, can be suppressed during the sensing period.

However, the voltage value of the write signal Vw at a point at which the amplitude becomes 50% of the maximum amplitude may not be higher than the voltage value of the common drive signal Vcom. For example, the high-level voltage value of the write signal Vw may be a voltage value higher than the voltage value of the common drive signal Vcom, and the low-level voltage value of the write signal Vw may be the voltage value of the voltage value of the common drive signal Vcom. In this case, the potential of the pixel electrode PE can be shifted to the high potential side by the capacitive coupling of the pixel electrode PE and the divisional electrode C, and variation in the potential difference between the pixel electrode PE and the divisional electrode C can be suppressed during the sensing period.

In contrast, the voltage value of the write signal Vw at a point at which the amplitude becomes 50% of the maximum amplitude may be lower than the voltage value of the common drive signal Vcom. For example, the high-level voltage value of the write signal Vw may be a voltage value of the common drive signal Vcom, and the low-level voltage value of the write signal Vw may be a voltage value lower than the voltage value of the common drive signal Vcom. In this case, the potential of the pixel electrodes PE can be shifted to the low potential side by the capacitive coupling of the pixel electrodes PE and the divisional electrodes C, and variation in the potential difference between the pixel electrodes PE and the divisional electrodes C can be suppressed during the sensing period.

After that, during the sensing period Ps(2), inputting the control signal SG and the video signal Vsig is stopped, the low-level control signal SLC is supplied to all the control electrodes EC via the control lines LC, the write signal Vw is written sequentially to the first to j-th divisional electrodes C1 to Cj, and the read signal Vr is read from the second detection electrode Rx2. The input position information in the area of the second target is thereby determined based on the read signal Vr.

Then, during the sensing period Ps(h), inputting the control signal SG and the video signal Vsig is stopped, the low-level control signal SLC is supplied to all the control electrodes EC via the control lines LC, the write signal Vw is written sequentially to the first to j-th divisional electrodes C1 to Cj, and the read signal Vr is read from the k-th detection electrode Rxk. The input position information in the area of the h-th target is thereby determined based on the read signal Vr.

The range of each target can be variously modified. The area of the first target may not be the area opposed to the first detection electrode Rx1 as explained above, but may be, for example, the area opposed to both the first detection electrode Rx1 and the second detection electrode Rx2.

Next, an off-leak property of the switching element of the liquid crystal display device DSP of the first embodiment will be explained. FIG. 13 is a graph showing a variation in a current amount flowing in the first region R1a of the first semiconductor layer SC1 of the first switching element PSW1 relative to the voltage value of the first gate electrode GE1 of the first switching element PSW1, in each of the first embodiment, a modified example of the first embodiment, and a comparative example of the first embodiment. FIG. 13 illustrates results of simulation, and the results are variable in accordance with design of the pixel switch.

As shown in FIG. 13, the same potential as the first gate electrode is set to the control electrode EC, in the first embodiment. The control electrode EC becomes the low level when the voltage value of the first gate electrode GE1 is in a range of 0V or lower, and the control electrode EC becomes the high level when the voltage value is in a range of 0V or higher.

It can be understood that the off-leak current amount of the switching element is small in the first embodiment. In this example, if the voltage value of the first gate electrode GE1 is −10.0V, the off-leak current amount of the first embodiment is smaller than an off-leak current amount of the comparative example to be explained below by a half of one digit. This is because a distance from the sixth region R2c to the control electrode EC is longer than a distance from the third region R1c to the first gate electrode GE1, and an electric field applied to the sixth region R2c via the second gate electrode GE2 by the drive of the control electrode EC is weaker than an electric field applied to the third region Rbc by the drive of the first gate electrode GE1. For this reason, an electric field of great strength is not applied to the sixth region R2c and increase in the off-leak current of the second switching element PSW2 (pixel switch) can be suppressed when the second switching element PSW2 is switched to be the nonconductive state.

According to the liquid crystal display device DSP and its driving method of the first embodiment constituted as explained above, the liquid crystal display device DSP comprises the first substrate SUB1. The first substrate SUB1 includes scanning line G, control line LC, control electrode EC electrically connected to the control line LC, signal line S, pixel electrode PE, and pixel switch. The pixel switch comprises the first switching element PSW1 and the second switching element PSW2 serially connected between the signal line S and the pixel electrode PE.

The first switching element PSW1 includes the first semiconductor layer SC1, the first gate electrode GE1 opposed to the first semiconductor layer SC1 and electrically connected to the gate line G, and the second insulating film 12 disposed between the first semiconductor layer SC1 and the first gate electrode GE1. The second switching element PSW2 includes the second semiconductor layer SC2, the second gate electrode GE2 opposed to the second semiconductor layer SC2 so as to be electrically in a floating state, and the second insulating film 12 disposed between the second semiconductor layer SC2 and the second gate electrode GE2. The control electrode EC is opposed to the second gate electrode GE2.

As explained above, the pixel switch is composed of not only the first switching element PSW1, but also the first switching element PSW1 and the second switching element PSW2 serially connected to each other. For this reason, the leak current occurring at the pixel switch can be reduced when the pixel switch is turned off. In particular, since high-strength electric field is not applied to the sixth region (channel region) R2c of the second switching element PSW2 when switching to the nonconductive state, increase in the off-leak current of the second switching element PSW2 (pixel switch) can be suppressed. After the video signal Vsig is supplied to the pixel electrode PE, the pixel electrode PE can preferably maintain the voltage and the variation in the electric potential of the pixel electrode PE can be suppressed. In the present embodiment, the variation in the electric potential of the pixel electrode PE can be suppressed, during the sensing period Ps following the display drive period Pd, too.

For this reason, energy consumption can be suppressed by setting the frame frequency at a value smaller than 60 Hz (for example, 15 Hz) while suppressing the degradation in display quality. If the frame frequency is set at 15 Hz, the display drive and the sensing drive can be performed at fifteen times each, alternately, for one second.

In addition, since the amount of the leak current occurring at the pixel switch is small as explained above, undesired potential variation at the divisional electrodes C, which accompanies the leak current, can be suppressed. The situation in which the sensor SE makes a detection error during the sensing period Ps can be avoided. For example, the situation of misunderstanding the undesired capacity variation between the divisional electrodes C and the detection electrodes Rx as the object during the sensing period Ps can be avoided.

Since the second switching element PSW2 does not use the scanning line G, the load capacitance of the thin-film transistor on the scanning line G can be reduced as compared with a case where both the first switching element PSW1 and the second switching element PSW2 use the same scanning line G. For this reason, increase in difference between the voltage value of the first gate electrode GE1 of the pixel PX to which the control signal SG is first input and the voltage value of the first gate electrode GE1 of the pixel PX to which the control signal SG is last input can be suppressed in the pixels PX connected to the same scanning line G.

The control line LC is opposed to the signal line S via the fourth insulating film (interlayer insulating film) 14 and extends along the signal line S. For this reason, degradation in the aperture ratio of the pixels PX can be suppressed as compared with a case where the control line LC is not opposed to the signal line S.

Thus, the liquid crystal display device DSP having excellent display quality and its driving method can be obtained. Alternatively, the liquid crystal display device capable of attempting to reduce the power consumption, and its driving method can be obtained by the present embodiment.

Modified Example of First Embodiment

Next, the liquid crystal display device DSP of a modified example of the first embodiment will be explained. FIG. 11 is an equivalent circuit diagram showing the pixel PX of the liquid crystal display device DSP of the modified example of the first embodiment.

As shown in FIG. 11, the modified example is broadly different from the first embodiment with respect to a feature that the first substrate SUB1 further includes a threshold adjustment line LT and a threshold adjustment electrode ET. The threshold adjustment electrode ET is electrically connected to the threshold adjustment line LT. The threshold adjustment electrode ET is opposed to the second gate electrode GE2. A dielectric such as an insulating film is interposed between the threshold adjustment electrode ET and the second gate electrode GE2. The threshold adjustment electrode ET is subjected to electrostatic capacitive coupling with the second gate electrode GE2. The voltage value of the second gate electrode GE2 can be adjusted based on the electrostatic capacitive coupling of the threshold adjustment electrode ET and the second gate electrode GE2, by supplying a threshold adjustment signal to the threshold adjustment line LT. In other words, the threshold voltage value of the second switching element PSW2 can be adjusted.

Next, an off-leak property of the pixel PX of the liquid crystal display device DSP of the modified example will be explained.

As shown in FIG. 13, it can be understood that the off-leak current amount of the pixel PX is also small in the modified example, similarly to the first embodiment. In this example, too, if the voltage value of the first gate electrode GE1 is −10.0V, the off-leak current amount of the modified example is smaller than an off-leak current amount of the comparative example to be explained below by a half of one digit. The current amount flowing in the first region R1a when the voltage value of the first gate electrode GE1 is set at 0V can be reduced as compared with the first embodiment, by adjusting the threshold voltage value of the second switching element PSW2.

In the liquid crystal display device DSP of the modified example of the first embodiment constituted as explained above, the same advantages as those obtained in the first embodiment can be obtained since the liquid crystal display device DSP comprises the first switching element PSW1 and the second switching element PSW2 serially connected to each other between the signal line S and the pixel electrode PE.

Comparative Example of First Embodiment

Next, the liquid crystal display device DSP of a comparative example of the first embodiment will be explained. FIG. 12 is an equivalent circuit diagram showing the pixel PX of the liquid crystal display device DSP of the comparative example of the first embodiment.

As shown in FIG. 12, the comparative example is broadly different from the first embodiment with respect to a feature that the pixel switch comprises the first switching element PSW1 alone and does not comprise the second switching element PSW2. In addition, the liquid crystal display device DSP of the comparative example is formed without the control line drive circuit LD, the control line LC and the control electrode EC.

Next, an off-leak property of the pixel PX of the liquid crystal display device DSP of the comparative example will be explained.

As shown in FIG. 13, it can be understood that the off-leak current amount of the pixel PX is large in the comparative example.

In the liquid crystal display device DSP of the comparative example of the first embodiment as constituted as explained above, the same advantages as those obtained in the first embodiment cannot be obtained since the liquid crystal display device DSP does not comprise the second switching element PSW2.

Second Embodiment

Figure 14:
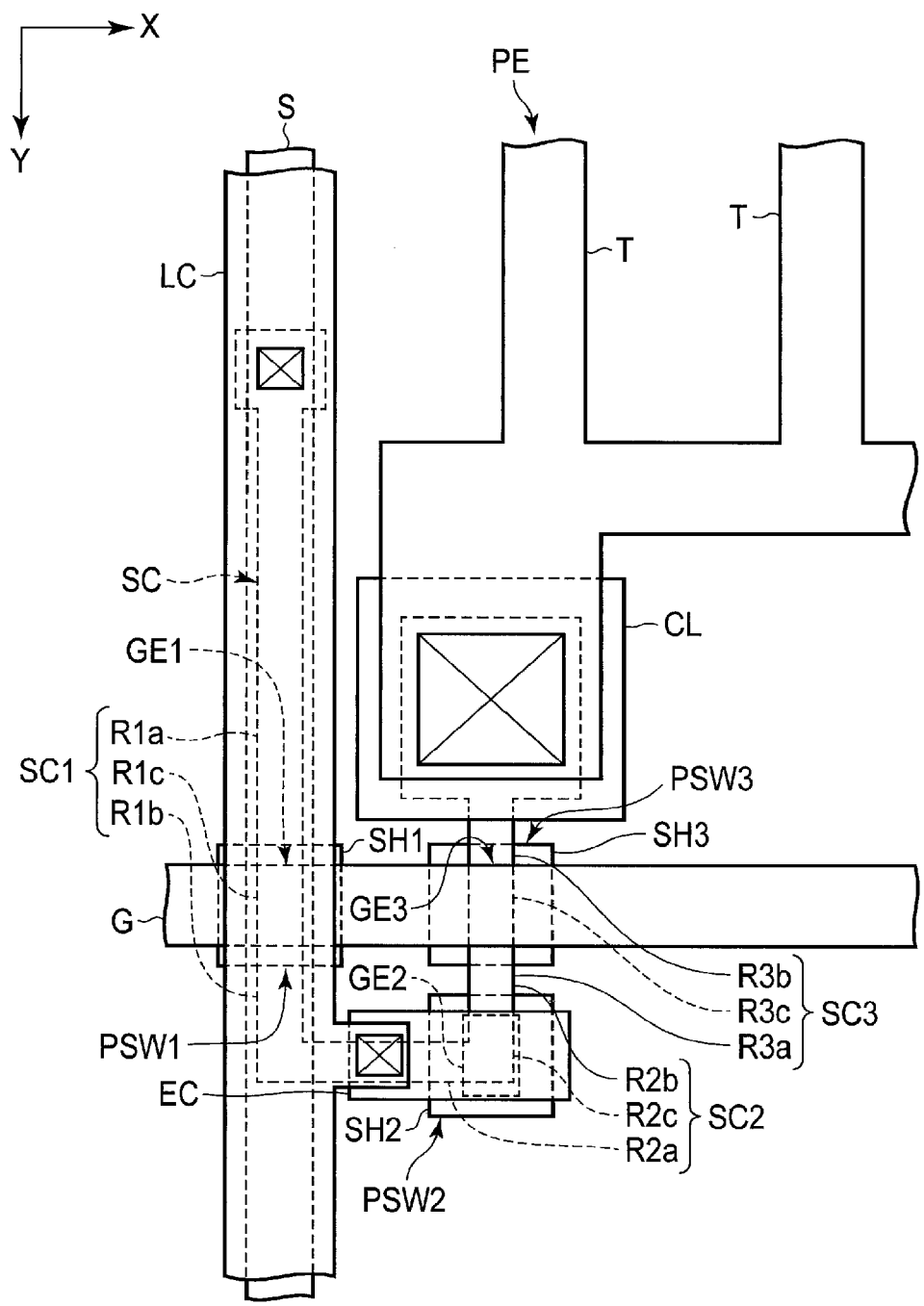
FIG. 14 is a plan view showing in part a first substrate of a liquid crystal display device of a second embodiment, illustrating in part a pixel.

Next, a liquid crystal display device DSP and its driving method, of the second embodiment, will be explained in detail. FIG. 14 is a plan view showing in part a first substrate SUS1 of the liquid crystal display device of the second embodiment, illustrating in part a pixel PX.

As shown in FIG. 14, the second embodiment is broadly different from the first embodiment with respect to a feature that the pixel switch comprises not only the first switching element PSW1 and the second switching element PSW2, but also the third switching element PSW3. The pixel switch comprises three switching elements serially connected between a signal line S and a pixel electrode PE.

The first switching element PSW1 is connected between the signal line S and the pixel electrode PE, the second switching element PSW2 is connected between the first switching element PSW1 and the pixel electrode PE, and the third switching element PSW3 is connected between the second switching element PSW2 and the pixel electrode PE. However, positional relationship among the first to third switching elements PSW1 to PSW3 is not particularly limited and can be variously modified, and the first to third switching elements PSW1 to PSW3 may be serially connected between the signal line S and the pixel electrode PE.

The first switching element PSW1 includes a first semiconductor layer SC1, a first gate electrode GE1, and a first gate insulating film. The first gate electrode GE1 is opposed to the first semiconductor layer SC1 and is electrically connected to a scanning line G. In the present embodiment, the first gate electrode GE1 is formed by a part of the scanning line G. The first gate insulating film is disposed between the first semiconductor layer SC1 and the first gate electrode GE1. In the present embodiment, the first gate insulating film is formed by a second insulating film 12.

The second switching element PSW2 includes a second semiconductor layer SC2, a second gate electrode GE2, and a second gate insulating film. The second gate electrode GE2 is opposed to the second semiconductor layer SC2 and is electrically in a floating state. The second gate electrode GE2 is often called a floating-gate electrode. The second gate insulating film is disposed between the second semiconductor layer SC2 and the second gate electrode GE2. In the present embodiment, the second gate insulating film is formed by the second insulating film 12.

The third switching element PSW3 includes a third semiconductor layer SC3, a third gate electrode GE3, and a third gate insulating film. The third gate electrode GE3 is opposed to the third semiconductor layer SC3 and is electrically connected to the scanning line G. In the present embodiment, the third gate electrode GE3 is formed by a part of the scanning line G. The third gate insulating film is disposed between the third semiconductor layer SC3 and the third gate electrode GE3. In the present embodiment, the third gate insulating film is formed by the second insulating film 12. The first switching element PSW1 and the third switching element PSW3 use the same scanning line G.

In the present embodiment, the first semiconductor layer SC1, the second semiconductor layer SC2 and the third semiconductor layer SC3 are formed integrally to constitute the semiconductor layer SC. The semiconductor layer SC is shaped in a U letter in view of the X-Y plane in which the third switching element PSW3 is located on the upper side and the second switching element PSW2 is located on the lower side.

The first semiconductor layer SC1 includes a first region R1a electrically connected to the signal line S, a second region R1b, and a third region R1c serving as the first channel region which is located between the first region R1a and the second region R1b and opposed to the first gate electrode GE1. The first region R1a and the third region R1c are opposed to the signal line S. A part of the second region R1b is also opposed to the signal line S.

The second semiconductor layer SC2 includes the fourth region R2a electrically connected to the second region R1b, the fifth region R2b, and the sixth region R2c serving as the second channel region which is located between the fourth region R2a and the fifth region R2b and opposed to the second gate electrode GE2. The second region R1b and the fourth region R2a share a partial region of the semiconductor layer SC.

The third semiconductor layer SC3 includes the seventh region R3a electrically connected to the fifth region R2b, the eighth region R3b electrically connected to the pixel electrode PE, and the ninth region R3c serving as the third channel region which is located between the seventh region R3a and the eighth region R3b and opposed to the third gate electrode GE3. The fifth region R2b and the seventh region R3a share a partial region of the semiconductor layer SC.

The first light-shielding layer SH1 is opposed to the third region R1c opposed to the first gate electrode GE1, in the first semiconductor layer SC1. In the present embodiment, the area of the first light-shielding layer SH1 is larger than the area of the third region R1c, and the entire third region R1c is opposed to the first light-shielding layer SH1.

The second light-shielding layer SH2 is opposed to the sixth region R2c opposed to the second gate electrode GE2, in the second semiconductor layer SC2. In the present embodiment, the area of the second light-shielding layer SH2 is larger than the area of the sixth region R2c, and the entire sixth region R2c is opposed to the second light-shielding layer SH2.

The third light-shielding layer SH3 is opposed to the ninth region R3c opposed to the third gate electrode GE3, in the third semiconductor layer SC3. In the present embodiment, the area of the third light-shielding layer SH3 is larger than the area of the ninth region R3c, and the entire ninth region R3c is opposed to the third light-shielding layer SH3.

In the second embodiment, the first to third light-shielding layers SH1 to SH3 are formed of a metal and spaced apart from each other in an insulation distance. In addition, the first to third light-shielding layers SH1 to SH3 may be disposed as needed.

The control electrode EC is opposed to the second gate electrode GE2. The second gate electrode GE2 is subjected to electrostatic capacitive coupling with the control electrode EC. In the present embodiment, the area of the control electrode EC is larger than the area of the second gate electrode GE2, and the entire second gate electrode GE2 is opposed to the control electrode EC.

The control line LC is opposed to the signal line S and extends along the signal line S. The control line LC is electrically connected to the control electrode EC. The control line LC has a protruding portion, which is opposed to the control electrode EC to be in contact with the control electrode EC through a contact hole formed in the fourth insulating film 14.

In addition, the method of driving the liquid crystal display device DSP, of the first embodiment can be used as a method of driving the liquid crystal display device DSP, of the second embodiment.

According to the liquid crystal display device DSP and its driving method of the second embodiment constituted as explained above, the liquid crystal display device DSP comprises a first substrate SUB1. The first substrate SUB1 includes scanning line G, control line LC, control electrode EC electrically connected to the control line LC, signal line S, pixel electrode PE, and pixel switch. The pixel switch comprises the first switching element PSW1, the second switching element PSW2 and the third switching element PSW3 serially connected to each other, between the signal line S and the pixel electrode PE. For this reason, the same advantages as those of the liquid crystal display device DSP and its driving method, of the first embodiment, can be obtained from the liquid crystal display device DSP and its driving method, of the second embodiment.

Thus, the liquid crystal display device DSP having excellent display quality and its driving method can be obtained. Alternatively, the liquid crystal display device capable of attempting to reduce the power consumption, and its driving method can be obtained by the present embodiment.

Third Embodiment

Figure 16:
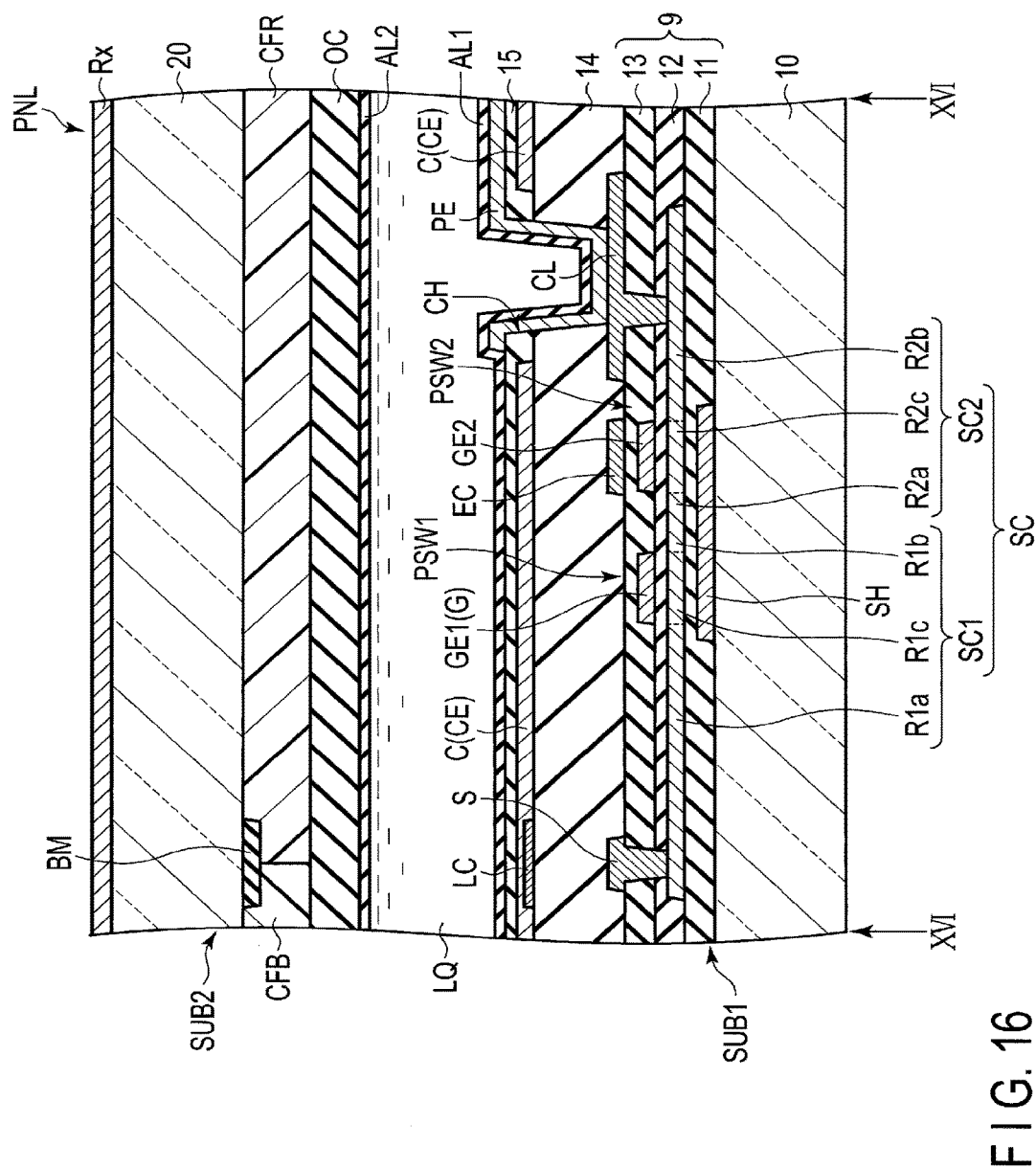
FIG. 16 is a cross-sectional view showing the liquid crystal display panel of the third embodiment as seen along line XVI-XVI of FIG. 15.

Next, a liquid crystal display device DSP and its driving method, of the third embodiment, will be explained in detail. The third embodiment is broadly different from the first embodiment with respect to features that a light-shielding layer of a first switching element PSW1 is electrically connected to a light-shielding layer of a second switching element PSW2 and that a control electrode EC is electrically connected to divisional electrodes C. FIG. 15 is a plan view showing in part a first substrate SUB1 of the liquid crystal display device of the third embodiment, illustrating in part a pixel PX. FIG. 16 is a cross-sectional view showing a liquid crystal display panel PNL of the third embodiment as seen along line XVI-XVI of FIG. 15.

As shown in FIG. 15, a light-shielding layer SH is at least opposed to a first channel region opposed to a first gate electrode GE1, in a first semiconductor layer SC1, and a second channel region opposed to a second gate electrode GE2, in a second semiconductor layer SC2. The light-shielding layer SH is opposed to the entire first channel region and the entire second channel region. The light-shielding layer SH is formed of a metal.

As shown in FIG. 16, the divisional electrodes C are formed in a band shape and electrically connected to the opposed control line LC. For this reason, the control line LC and the divisional electrodes C are electrically controlled together. In the present embodiment, the liquid crystal display device DSP is formed without a common electrode drive circuit CD, a control line drive circuit LD functions as a first driving module, and the control line LC is driven and the divisional electrodes C are indirectly driven by the control line drive circuit LD. However, the liquid crystal display device DSP may be formed without the control line drive circuit LD, the common electrode drive circuit CD may function as a first driving module, and the divisional electrodes C may be driven and the control line LC may be indirectly driven by the common electrode drive circuit CD. In the present embodiment, too, the control line LC is electrically connected to the control electrode EC.

The light-shielding layer SH is located under the first semiconductor layer SC1 and the second semiconductor layer SC2. The light-shielding layer SH is opposed to both the first semiconductor layer SC1 and the second semiconductor layer SC2. The light-shielding layer SH is opposed to at least one of the first gate electrode GE1 and the scanning line G, at a position remote from the first semiconductor layer SC1 and the second semiconductor layer SC2. The light-shielding layer SH is subjected to capacitive coupling with at least one of the first gate electrode GE1 and the scanning line G.

Next, a method of driving the liquid crystal display device DSP of the third embodiment will be explained in detail.

Figure 17:
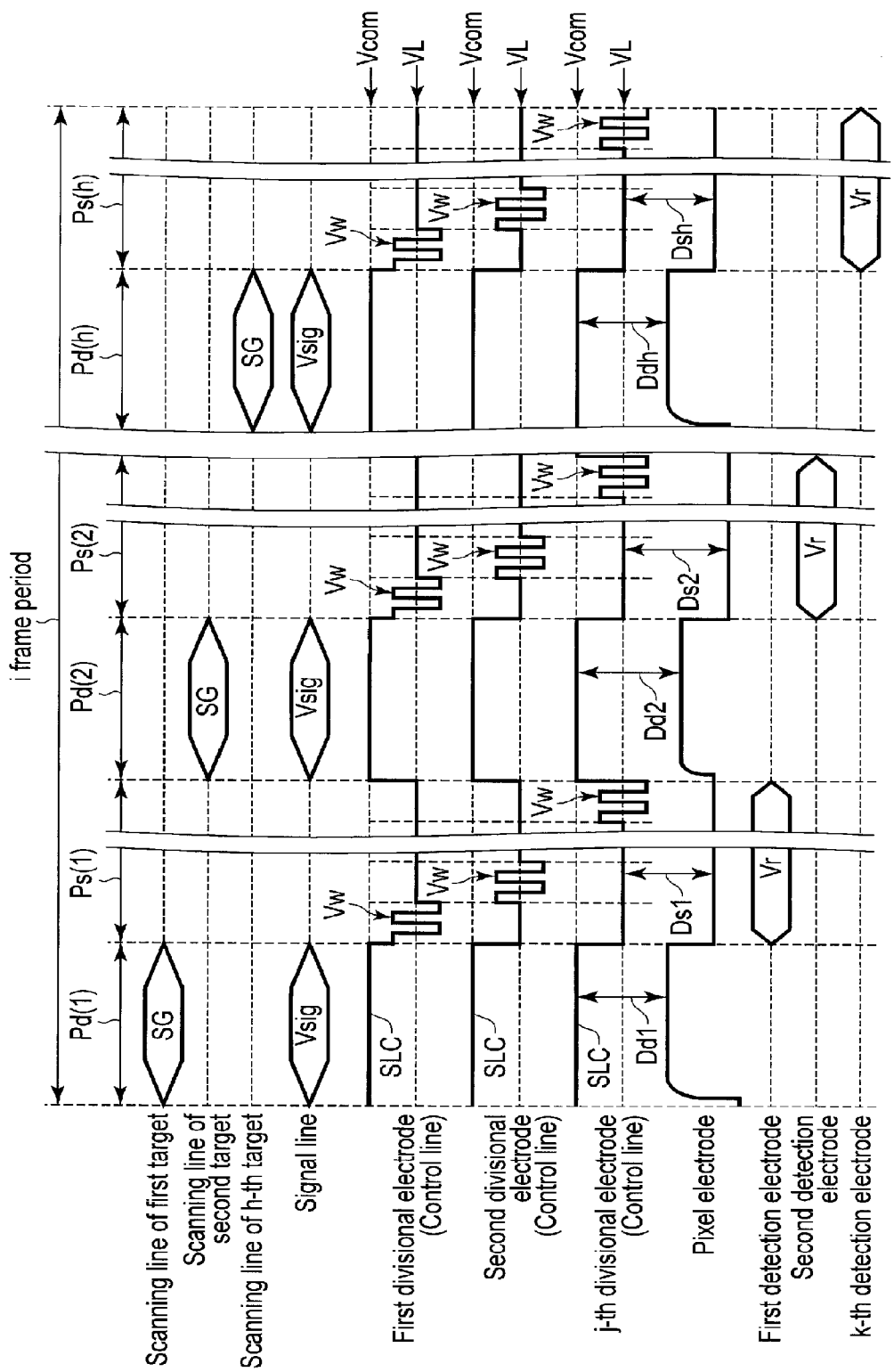
FIG. 17 is a timing chart for explaining a method of driving the liquid crystal display device of the third embodiment, illustrating a control signal, a video signal, a common drive signal, a potential of a pixel electrode, a write signal, and a read signal during an arbitrary i-frame period.

FIG. 17 is a timing chart for explaining the method of driving the liquid crystal display device of the third embodiment, illustrating a control signal SG, a video signal Vsig, a common drive signal Vcom, a potential of the pixel electrode PE, a write signal Vw, and a read signal Vr during an arbitrary i-frame period.

A method of driving the liquid crystal display device DSP during the i-frame period which is an arbitrary i-th frame (1F) period will be explained here.

As shown in FIG. 17, the driver IC chip IC1, the driver IC chip IC2, the scanning line drive circuit GD, and the control module CM repeat the display drive performed during the display drive period Pd and the sensing drive performed during the sensing period Ps, during the i-frame period, in the present embodiment.

In the present embodiment, the display area DA is divided into h targets (blocks), and the display drive and the sensing drive are performed for each target. The targets are opposed to respective detection electrodes Rx. In other words, the number h of targets is equal to the number k of the detection electrodes Rx (h=k), in the present embodiment, too. In addition, the area of the target where the display drive is performed is assumed to be the same as the area of the target where the sensing drive is performed successively with the display drive.

During a first display drive period Pd(1) of the frame period, a first display drive of writing the video signal Vsig to the pixels PX of a first target opposed to the first detection electrode Rx1 is performed. During a first sensing period Ps(1) following the display drive period Pd(1), a first sensing drive of performing the sensing drive for the first detection electrode Rx1 and all the divisional electrodes C1 to Cj (all the control lines LC) and detecting the object (conductor) in the area of the first target is performed.

During a second display drive period Pd(2) following the sensing period Ps(1), a second display drive of writing the video signal Vsig to the pixels PX of a second target opposed to the second detection electrode Rx2 is performed. During a second sensing period Ps(2) following the display drive period Pd(2), a second sensing drive of performing the sensing drive for the second detection electrode Rx2 and all the divisional electrodes C1 to Cj (all the control lines LC) and detecting the object (conductor) in the area of the second target is performed.

During the last h-th display drive period Pd(h), an h-th display drive of writing the video signal Vsig to the pixels PX of an h-th target opposed to the k-th detection electrode Rxk is performed. During the last h-th sensing period Ps(h) following the display drive period Pd(h), an h-th sensing drive of performing the sensing drive for the k-th detection electrode Rxk and all the divisional electrodes C1 to Cj (all the control lines LC) and detecting the object (conductor) in the area of the h-th target is performed.

During the display drive period Pd, the control signal SG is supplied from the scanning line drive circuit GD to the scanning lines G, the video signal Vsig is supplied from the signal line drive circuit SD to the signal lines S, the control signal SLC is supplied from the control line drive circuit LD to the control lines LC, and the liquid crystal display panel PNL is driven. The control signal SLC during the display drive period Pd corresponds to the common drive signal Vcom. When the second switching element PSW2 is noticed, the second switching element PSW2 remains in the nonconductive state even if, for example, the common drive signal Vcom having the voltage value of 0V is supplied to the control electrode EC. However, the light-shielding layer SH opposed to the second semiconductor layer SC2 is subjected to capacitive coupling with at least one of the first gate electrode GE1 and the scanning line G to which a high-level control signal SG is supplied. Since the light-shielding layer SH functions as the gate electrode of the second switching element PSW2, the first switching element PSW1 and the second switching element PSW2 are switched to be in the conductive state by the high-level control signal SG.

More specifically, during the display drive period Pd(1) of the i-frame period, the control signal SG is supplied to the scanning lines G of the first target, the video signal Vsig is supplied to the signal lines S1 to Sm, the common drive signal Vcom is supplied as the control signal SLC to all the control lines LC and all the divisional electrodes C, and the pixels PX of the first target are driven.

After that, during the display drive period Pd(2), the control signal SG is supplied to the scanning lines G of the second target, the video signal Vsig is supplied to the signal lines S1 to Sm, the common drive signal Vcom is supplied as the control signal SLC to all the control lines LC and all the divisional electrodes C, and the pixels PX of the second target are driven.

Then, during the display drive period Pd(h), the control signal SG is supplied to the scanning lines G of the h-th target, the video signal Vsig is supplied to the signal lines S1 to Sm, the common drive signal Vcom is supplied as the control signal SLC to all the control lines LC and all the divisional electrodes C, and the pixels PX of the h-th target are driven.

During the sensing period Ps, the input of the control signal SG and the video signal Vsig to the liquid crystal display panel PNL is stopped, and the sensor SE is driven. The first switching elements PSWJ and the second switching elements PSW2 of all the pixels PX can be thereby switched to be in the nonconductive state. A write signal Vw is supplied as the control signal SLC, sequentially, to the divisional electrodes C via the control lines LC, and the write signal Vw is adjusted so as to maintain the second switching element PSW2 in the nonconductive state. The voltage level of the write signal Vw is lower than that of the common drive signal Vcom. For this reason, a situation in which the second switching element PSW2 is switched to be in the conductive state by the write signal Vw during the sensing period Ps can be avoided.

More specifically, during the sensing period Ps(1) of the i-frame period, inputting the control signal SG and the video signal Vsig is stopped, the write signal Vw is written as the control signal SLC, sequentially, to the first to j-th divisional electrodes C1 to Cj via the control lines LC, and the read signal Vr is read from the first detection electrode Rx1. For example, the write signal Vw is a pulse signal having a high frequency of MHz order and an amplitude of approximately 2V. The input position information in the area of the first target is thereby determined based on the read signal Vr. The signal VL is written to the divisional electrodes during the sensing period Ps(1) excluding a period in which the write signal Vw is written.

It should be noted that the write signal Vw is a pulse signal. The high-level voltage value of the write signal Vw is lower than that of the common drive signal Vcom. The voltage value of the write signal Vw at a point at which the amplitude becomes 50% of the maximum amplitude is the voltage value of the signal VL and lower than the voltage value of the common drive signal Vcom. The potential of the divisional electrodes C is varied by allowing the display drive period Pd(1) to shift to the sensing period Ps(1), but the potential of the pixel electrodes PE opposed to the divisional electrodes C is shifted to the low potential side by the variation. Since difference between a potential difference Ds1 between the pixel electrode PE and the divisional electrode C during the sensing period Ps(1) and a potential difference Dd1 between the pixel electrode PE and the divisional electrode C during the display drive period Pd(1) is not caused to become great, the images of the same gradation level as that during the display drive period Pd(1) can also be displayed during the sensing period Ps(1).

However, if the second switching element PSW2 is capable of being maintained in the nonconductive state, the high-level voltage value of the write signal Vw may be set to be the same as a voltage value of the signal VL or the low-level voltage value of the write signal Vw may be set to be the same as the voltage value of the signal VL.

After that, during the sensing period Ps(2), inputting the control signal SG and the video signal Vsig is stopped, the write signal Vw is written as the control signal SLC, sequentially, to the first to j-th divisional electrodes C1 to Cj via the control lines LC, and the read signal Vr is read from the second detection electrode Rx2. The input position information in the area of the second target is thereby determined based on the read signal Vr. In this situation, too, difference between a potential difference Ds2 between the pixel electrode PE and the divisional electrode C during the sensing period Ps(2) and a potential difference Dd2 between the pixel electrode PE and the divisional electrode C during the display drive period Pd(2) is not caused to become great.

After that, during the sensing period Ps(h), inputting the control signal SG and the video signal Vsig is stopped, the write signal Vw is written as the control signal SLC, sequentially, to the first to j-th divisional electrodes C1 to Cj via the control lines LC, and the read signal Vr is read from the k-th detection electrode Rxk. The input position information in the area of the h-th target is thereby determined based on the read signal Vr. In this situation, too, difference between a potential difference Dsh between the pixel electrode PE and the divisional electrode C during the sensing period Ps(h) and a potential difference Ddh between the pixel electrode PE and the divisional electrode C during the display drive period Pd(h) is not caused to become great.

The range of each target can be variously modified. The area of the first target may not be the area opposed to the first detection electrode Rx1 as explained above, but may be, for example, the area opposed to both the first detection electrode Rx1 and the second detection electrode Rx2.

According to the liquid crystal display device DSP and its driving method of the third embodiment constituted as explained above, the liquid crystal display device DSP comprises the first substrate SUB1. The first substrate SUB1 includes scanning line G, signal line S, pixel electrode PE, divisional electrode C, control electrode EC electrically connected to the divisional electrode C, and pixel switch. Each pixel switch comprises the first switching element PSW1 and the second switching element PSW2 serially connected to each other, between the signal line S and the pixel electrode PE. The liquid crystal display device DSP further comprises the light-shielding layer SH, the second switching element PSW2 is switched to be in the conductive state during the display drive period Pd or the nonconductive state during the sensing period Ps. For this reason, the same advantages as those of the liquid crystal display device DSP and its driving method, of the first embodiment, can be obtained from the liquid crystal display device DSP and its driving method, of the third embodiment.

In addition, in the third embodiment, for example, reduction in energy consumption can be attempted as compared with a case of electrically controlling the control electrodes EC and the divisional electrodes C independently of each other since the control electrodes EC and the divisional electrodes C can be electrically controlled together.

Thus, the liquid crystal display device DSP having excellent display quality and its driving method can be obtained. Alternatively, the liquid crystal display device capable of attempting to reduce the power consumption, and its driving method can be obtained by the present embodiment.

Modified Example of Third Embodiment

Figure 18:
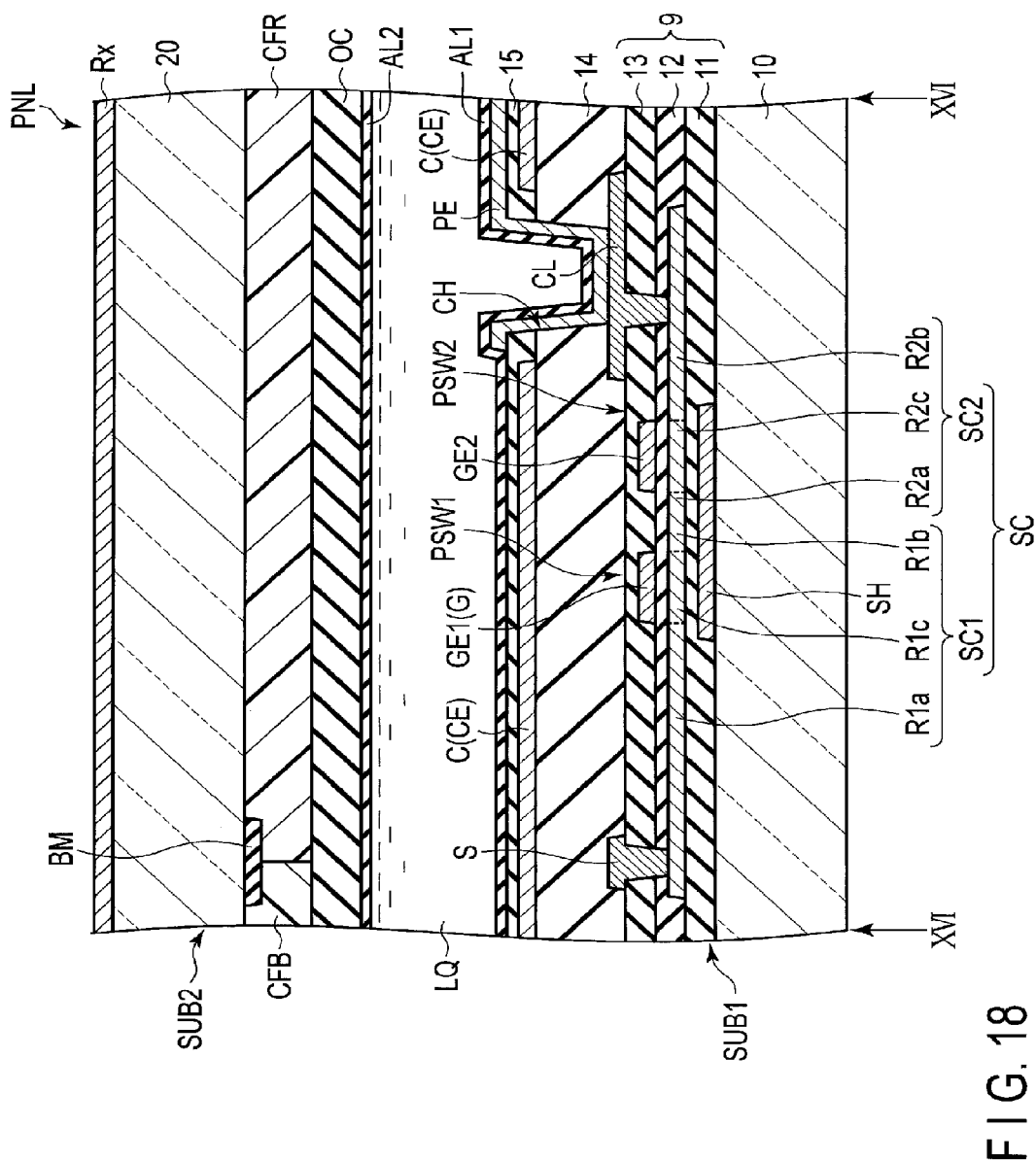
FIG. 18 is a cross-sectional view showing a liquid crystal display panel of a modified example of the third embodiment.

Next, the liquid crystal display device DSP of a modified example of the third embodiment will be explained. FIG. 18 is a cross-sectional view showing the liquid crystal display panel PNL of the modified example of the third embodiment. As shown in FIG. 18, the modified example is broadly different from the third embodiment with respect to a feature that the liquid crystal display panel PNL is formed without the control electrode EC, the control line LC and the control line drive circuit LD and is formed to further include a common electrode drive circuit CD. The common electrode driving circuit CD supplies the common drive signal Vcom, the write signal Vw and the signal VL to the divisional electrodes C.

In the liquid crystal display device DSP of the third embodiment constituted as explained above, too, the liquid crystal display device DSP comprises the first switching element PSW1 and the second switching element PSW2 serially connected between the signal line S and the pixel electrode PE. The second switching element PSW2 is switched to be the conductive state or the nonconductive state by using the light-shielding layer SH or the like. For this reason, the same advantages as those obtained in the third embodiment can also be obtained in the modified example.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the divisional electrodes C may extend in the first direction X and be spaced apart from each other in the second direction Y, and the detection electrodes Rx may extend in the second direction Y and be spaced apart from each other in the first direction X. In this case, the layout of the common electrode drive circuit CD and the control lines LC may be adjusted as needed. For example, the control lines LC may be opposed to the scanning lines G and extend along the scanning lines G.

In the above-explained embodiments, the divisional electrodes C function as the sensor drive electrodes but are not limited to these. For example, if the control lines LC adjacent to each other as explained in the embodiments are connected to the control line drive circuit LD in a bundled state and are opposed to the detection electrodes Rx without sandwiching the conductors, the control lines LC may be allowed to function as the sensor drive electrodes by supplying the write signal (sensor drive signal) Vw to the control lines LC. In this case, the common electrodes CE do not need to be separated as the divisional electrodes C as explained in the embodiments and can be formed by adjusting the line layout of the control lines LC. In other words, the common electrodes CE may be a single electrode.

If the control lines LC are not used as the sensor drive electrodes, all the control lines LC may be electrically connected to each other and connected to the control line drive circuit LD in a bundled state. The control line drive circuit LD can thereby electrically control all the control lines LC together by one output signal.

In addition, if the control lines LC are disposed, the control lines LC need only to be electrically connected to at least the control electrodes EC, and the number, shape, layout, and the like of the control lines LC can be variously changed. The control lines LC do not need to be opposed to all the signal lines S or all the scanning lines G and may be located in a layer different from the common electrodes CE. For example, the control lines LC may be formed on the third insulating film 13 and covered with the fourth insulating film 14 and extend parallel to the signal line S, and may be formed integrally with the control electrode EC.

The liquid crystal display device DSP may be formed without the sensor SE. In this case, the liquid crystal display device DSP can set the frame frequency at a value smaller than 60 Hz and attempt to reduce the energy consumption while suppressing the degradation in display quality, by comprising at least two switching elements, i.e., the first switching element PSW1 and the second switching element PSW2 serially connected between the signal line S and the pixel electrode PE. In this case, too, the common electrode CE may be formed by one electrode.

To reduce the resistance of the segments Ca, the metal layer ML needs only to be electrically connected to the segments Ca, and the position, shape and the like of the metal layer ML can be variously changed. For example, the metal layer ML may be formed on the third insulating film 13 and covered with the fourth insulating film 14 and extend parallel to the signal line S, and may be electrically connected to the divisional electrodes C (common electrodes CE). Alternatively, the metal layer ML may be formed on the second insulating film 12 and covered with the third insulating film 13 and extend parallel to the scanning line G, and may be electrically connected to the divisional electrodes C (common electrodes CE). The metal layer ML may not be disposed.

The first semiconductor layer SC1 and the second semiconductor layer SC2 may be connected by an impurity-doped third semiconductor layer.

Each of the first switching element PSW1 and the second switching element PSW2 may be formed by not a single-gate thin-film transistor, but a double-gate thin-film transistor or a triple-gate thin-film transistor. The pixel switches may be composed of at least four serially connected switching elements including the first switching element PSW1 and the second switching element PSW2.

The first driving module is not limited to the common electrode drive circuit CD or the control line drive circuit LD but can be variously modified, and may be a driving module configured to supply the common drive signal Vcom or the write signal Vw to the common electrodes CE.

The second driving module is not limited to the driver IC chip IC2, but can be variously modified, and may be a driving module configured to read the read signal Vr from the detection electrodes Rx.

The lead lines L and the detection electrodes Rx may be disposed on the inner surface side of the second insulating substrate 20 (i.e., the surface side of the second insulating substrate 20 which is opposed to the first substrate SUB1). Alternatively, the lead lines L and the detection electrodes Rx may be disposed at an upper part of the inner surface of the first insulating substrate 10 (i.e., the surface opposed to the second substrate SUB2). In other words, the lead lines L and the detection electrodes Rx may be disposed in any one of layers of a layered structure including the liquid crystal display panel PNL and the cover which covers the liquid crystal display panel PNL.

If the lead lines L and the detection electrodes Rx are located between the first insulating substrate 10 and the second insulating substrate 20, the driver IC chips IC1 and IC2 may be formed integrally. In other words, the driver IC chips IC1 and IC2 may be integrated in a single driver IC chip (driving module). In this case, the single driver IC chip is connected to the liquid crystal display panel PNL and the control module CM. Furthermore, the single driver IC chip is connected to the sensor SE (lead lines L) via the lines and electrodes formed on the liquid crystal display panel PNL.

The liquid crystal display device DSP and its driving method are exemplified in the embodiments. However, the embodiments can be applied to the other liquid crystal display devices and their driving methods. Moreover, the embodiments can be applied to the various types of display devices and their driving methods. It is needless to say that the embodiments can be applied to middle or small display devices and large display devices without particular limitation.

What is claimed is:
1. A display device comprising:
a first substrate including a scanning line, a control line, a control electrode electrically connected to the control line, a signal line, a pixel electrode, and a first switching element and a second switching element serially connected between the signal line and the pixel electrode, and a first interlayer insulating film,
wherein
the first switching element comprises a first semiconductor layer, a first gate electrode electrically connected to the scanning line, and a first insulating film disposed between the first semiconductor layer and the first gate electrode, the second switching element comprises a second semiconductor layer, a second gate electrode being electrically in a floating state, and a second insulating film disposed between the second semiconductor layer and the second gate electrode, the first insulating film is disposed between the first semiconductor layer and the scanning line, the first interlayer insulating film is disposed between the scanning line and the signal line, and between the control electrode and the second gate electrode, and the control electrode is overlapped with the second gate electrode which is capacitively coupled with the control electrode.

2. The display device of claim 1, wherein
the control line extends along the signal line, and
the first substrate further includes a second interlayer insulating film disposed between the signal line and the control line.

3. The display device of claim 1, further comprising:
a second substrate opposed to the first substrate and spaced apart from the first substrate; and
a liquid crystal layer held between the first substrate and the second substrate,
wherein
the first substrate further includes a common electrode opposed to the pixel electrode.

4. The display device of claim 3, further comprising:
a first driving circuit which supplies a common voltage to the common electrode during a display period for displaying an image and supplies a sensor drive signal to any one of the common electrode and the control line during a sensing period for sensing;
a detection electrode; and
a second driving circuit which reads from the detection electrode a read signal indicating a variation of a sensor signal generated between the detection electrode and any one of the common electrode and the control line during the sensing period.

5. The display device of claim 4, wherein
the first driving circuit supplies a control signal to the control line, switches the second switching element to a conductive state during the display period, and switches the second switching element to a nonconductive state during the sensing period.

6. The display device of claim 3, wherein
the common electrode includes a first divisional electrode and a second divisional electrode which extend in a direction of extension of the signal line and are located to be spaced apart from each other in a direction intersecting the direction of extension of the signal line.

7. The display device of claim 1, wherein
the first semiconductor layer and the second semiconductor layer are connected to each other by an impurity-doped third semiconductor layer.

8. A display device comprising:
a first substrate including a scanning line, a conductive light-shielding layer, a signal line, a pixel electrode, a common electrode, a control electrode, and a first switching element and a second switching element serially connected between the signal line and the pixel electrode,
wherein
the first switching element comprises a first semiconductor layer, a first gate electrode opposed to the first semiconductor layer and electrically connected to the scanning line, and a first insulating film disposed between the first semiconductor layer and the first gate electrode, the second switching element comprises a second semiconductor layer, a second gate electrode opposed to the second semiconductor layer and being electrically in a floating state, and a second insulating film disposed between the second semiconductor layer and the second gate electrode, the light-shielding layer is located below the first semiconductor layer and the second semiconductor layer, opposed to the first semiconductor layer and the second semiconductor layer, and opposed to at least one of the first gate electrode and the scanning line at a position remote from the first semiconductor layer and the second semiconductor layer, the common electrode is located above the first gate electrode and the second gate electrode, and is opposed to the pixel electrode, and the control electrode is located between the second gate electrode and the common electrode, and is electrically connected to the common electrode.

9. The display device of claim 8, further comprising:
a second substrate opposed to the first substrate and spaced apart from the first substrate; and
a liquid crystal layer held between the first substrate and the second substrate,
wherein
the first substrate further includes a control line opposed to the signal line and being in direct contact with the common electrode.

10. The display device of claim 9, further comprising:
a first driving circuit which supplies a common drive signal to the common electrode during a display period for displaying an image and supplies a sensor drive signal to the common electrode during a sensing period for sensing;
a detection electrode; and
a second driving circuit which reads from the detection electrode a read signal indicating a variation of a sensor signal generated between the common electrode and the detection electrode during the sensing period.

11. The display device of claim 10, wherein
the sensor drive signal is adjusted to hold the second switching element in a nonconductive state during the sensing period.

12. The display device of claim 8, wherein
the first semiconductor layer and the second semiconductor layer are connected to each other by an impurity-doped third semiconductor layer.

13. The display device of claim 8, wherein
the second semiconductor layer is located between the second gate electrode and the light-shielding layer, and
the second gate electrode is located between the second semiconductor layer and the control electrode.

* * * * *